United States Patent
Mars et al.

(10) Patent No.: US 11,411,735 B2
(45) Date of Patent: Aug. 9, 2022

(54) METHODS AND APPARATUS FOR AUTHORIZING AND PROVIDING OF DISTRIBUTED GOODS OR SERVICES

(71) Applicant: Proxy, Inc., San Francisco, CA (US)

(72) Inventors: Denis Mars, San Francisco, CA (US); Simon Ratner, San Francisco, CA (US)

(73) Assignee: Proxy, Inc., San Francisco, CA (US)

( * ) Notice: Subject to any disclaimer, the term of this patent is extended or adjusted under 35 U.S.C. 154(b) by 0 days.

(21) Appl. No.: 17/174,950

(22) Filed: Feb. 12, 2021

(65) Prior Publication Data

US 2021/0194691 A1 Jun. 24, 2021

Related U.S. Application Data

(63) Continuation-in-part of application No. 16/717,973, filed on Dec. 17, 2019, which is a
(Continued)

(51) Int. Cl.
*H04L 9/32* (2006.01)
*H04W 4/80* (2018.01)
(Continued)

(52) U.S. Cl.
CPC ............ *H04L 9/3213* (2013.01); *G06F 1/163* (2013.01); *G06Q 20/401* (2013.01);
(Continued)

(58) Field of Classification Search
CPC ...... H04L 9/3213; H04W 4/80; G06Q 20/401
(Continued)

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |

(Continued)

FOREIGN PATENT DOCUMENTS

| | | |
|---|---|---|
| EP | 0486657 B1 | 12/1994 |
| EP | 2428774 A1 | 3/2012 |

OTHER PUBLICATIONS

Ip.com search.*

(Continued)

*Primary Examiner* — Allyson N Trail

(57) ABSTRACT

A system includes a first reader for receiving a first ephemeral ID, not permanently associated with a first device, for providing first transaction data thereto, for receiving and authenticating a first token from the first device and for performing a physical action when authenticated, a second reader for receiving a second ephemeral ID, not permanently associated with a second device, for providing second transaction data thereto, for receiving and authenticating a second token from the second device and for performing a physical action when authenticated, and an authentication provider for determining first and second tokens when the first and second smart devices are respectively authorized for transactions in response to a first set of policies specified by a third-party entity not directly coupled to the first or second readers.

20 Claims, 23 Drawing Sheets

Related U.S. Application Data continuation-in-part of application No. PCT/US2019/ 037553, filed on Jun. 17, 2019, and application No. 16/717,973, Dec. 17, 2019, application No. 17/174, 950, which is a continuation-in-part of application No. 16/717,951, filed on Dec. 17, 2019, which is a continuation-in-part of application No. PCT/US2019/ 037553, filed on Jun. 17, 2019, and application No. 16/717,951, Dec. 17, 2019.

(60) Provisional application No. 62/685,292, filed on Jun. 15, 2018, provisional application No. 62/789,063, filed on Jan. 7, 2019, provisional application No. 62/685,292, filed on Jun. 15, 2018, provisional application No. 62/789,063, filed on Jan. 7, 2019.

(51) Int. Cl.
*G06F 1/16* (2006.01)
*G07C 9/00* (2020.01)
*G06Q 20/40* (2012.01)

(52) U.S. Cl.
CPC ........ *G07C 9/00309* (2013.01); *H04L 9/3236* (2013.01); *H04W 4/80* (2018.02)

(58) Field of Classification Search
USPC .............................................................. 723/9
See application file for complete search history.

(56) References Cited

U.S. PATENT DOCUMENTS

| | | |
|---|---|---|
| 6,647,497 B1 | 11/2003 | Cromer et al. |
| 6,677,932 B1 | 1/2004 | Westerman |
| 7,382,253 B2 | 6/2008 | Oliveras |
| 7,606,560 B2 | 10/2009 | Labrou et al. |
| 7,937,447 B1 | 5/2011 | Cohen et al. |
| 8,181,867 B1 | 5/2012 | Bierbaum et al. |
| 8,347,720 B2 | 1/2013 | De Los Santos et al. |
| 8,495,720 B2 | 7/2013 | Counterman |
| 8,522,596 B2 | 9/2013 | Avery |
| 8,542,189 B2 | 9/2013 | Milne et al. |
| 8,544,326 B2 | 10/2013 | Je |
| 9,043,602 B1 | 5/2015 | Krieger et al. |
| 9,635,000 B1 | 4/2017 | Muftic |
| 10,125,519 B1 | 11/2018 | Gengler et al. |
| 2002/0015024 A1 | 2/2002 | Westerman et al. |
| 2002/0059639 A1 | 5/2002 | Thornton et al. |
| 2002/0131445 A1 | 9/2002 | Skubic et al. |
| 2004/0073795 A1 | 4/2004 | Jablon |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0053387 A1 | 3/2006 | Ording |
| 2006/0065730 A1 | 3/2006 | Quan et al. |
| 2006/0081695 A1 | 4/2006 | Jung et al. |
| 2006/0085757 A1 | 4/2006 | Andre et al. |
| 2006/0097991 A1 | 5/2006 | Hotelling et al. |
| 2006/0157563 A1 | 7/2006 | Marshall |
| 2006/0161870 A1 | 7/2006 | Hotelling et al. |
| 2006/0161871 A1 | 7/2006 | Hotelling et al. |
| 2006/0197753 A1 | 9/2006 | Hotelling |
| 2006/0206246 A1 | 9/2006 | Walker |
| 2007/0075965 A1 | 4/2007 | Huppi et al. |
| 2007/0155370 A1 | 7/2007 | Daigle |
| 2007/0257890 A1 | 11/2007 | Hotelling et al. |
| 2008/0006695 A1 | 1/2008 | Morita |
| 2008/0028206 A1 | 1/2008 | Sicard et al. |
| 2008/0140868 A1 | 6/2008 | Kalayjian et al. |
| 2008/0141356 A1 | 6/2008 | Giles et al. |
| 2008/0141357 A1 | 6/2008 | Deligne et al. |
| 2008/0155019 A1 | 6/2008 | Wallace et al. |
| 2008/0314971 A1 | 12/2008 | Faith et al. |
| 2009/0025435 A1 | 1/2009 | Popowski |
| 2009/0204348 A1 | 8/2009 | Davis et al. |
| 2009/0240625 A1 | 9/2009 | Faith |
| 2009/0305219 A1 | 12/2009 | Stuempfle |
| 2010/0089995 A1 | 4/2010 | El-Awady |
| 2011/0199308 A1 | 8/2011 | Nativel |
| 2011/0201381 A1 | 8/2011 | Herz et al. |
| 2011/0277025 A1 | 11/2011 | Counterman |
| 2011/0300802 A1 | 12/2011 | Proctor, Jr. et al. |
| 2011/0302014 A1 | 12/2011 | Proctor, Jr. et al. |
| 2012/0185697 A1 | 7/2012 | Buer |
| 2013/0043982 A1 | 2/2013 | Robshaw et al. |
| 2013/0111580 A1 | 5/2013 | Checco |
| 2013/0117078 A1 | 5/2013 | Weik, III et al. |
| 2013/0133087 A1 | 5/2013 | Proctor, Jr. et al. |
| 2013/0185358 A1 | 7/2013 | Lu et al. |
| 2014/0002236 A1 | 1/2014 | Pineau et al. |
| 2014/0003681 A1 | 1/2014 | Wright et al. |
| 2014/0013108 A1 | 1/2014 | Pellikka et al. |
| 2014/0025753 A1 | 1/2014 | Gronowski et al. |
| 2014/0133656 A1 | 5/2014 | Wurster et al. |
| 2014/0162601 A1 | 6/2014 | Kim et al. |
| 2014/0331286 A1 | 11/2014 | Davis et al. |
| 2015/0081566 A1 | 3/2015 | Slepinin |
| 2015/0100499 A1* | 4/2015 | Dua .................... H04B 5/0062 705/76 |
| 2015/0192988 A1 | 7/2015 | Aleksiev et al. |
| 2015/0227923 A1 | 8/2015 | Kutsch et al. |
| 2015/0248800 A1 | 9/2015 | Dawber et al. |
| 2015/0294149 A1 | 10/2015 | Palti-Wasserman et al. |
| 2015/0327316 A1 | 11/2015 | Hwang |
| 2015/0334523 A1 | 11/2015 | Lappetelainen et al. |
| 2015/0349960 A1 | 12/2015 | Bagley |
| 2015/0350902 A1 | 12/2015 | Baxley et al. |
| 2015/0371469 A1 | 12/2015 | Scalisi |
| 2015/0382156 A1 | 12/2015 | Gruteser et al. |
| 2016/0019736 A1 | 1/2016 | Radicella et al. |
| 2016/0065579 A1 | 3/2016 | Chen et al. |
| 2016/0150411 A1 | 5/2016 | Liu et al. |
| 2016/0154460 A1 | 6/2016 | von Liechtenstein |
| 2016/0171199 A1 | 6/2016 | Beatson et al. |
| 2016/0277370 A1 | 9/2016 | Lee et al. |
| 2016/0283603 A1 | 9/2016 | Langley |
| 2017/0013450 A1 | 1/2017 | Ziv et al. |
| 2017/0161978 A1 | 6/2017 | Wishne |
| 2017/0171178 A1 | 6/2017 | Reynders |
| 2017/0171200 A1 | 6/2017 | Bao et al. |
| 2017/0316497 A1 | 11/2017 | Song et al. |
| 2018/0032712 A1 | 2/2018 | Oh et al. |
| 2018/0165508 A1 | 6/2018 | Othman et al. |
| 2018/0176017 A1 | 6/2018 | Rodriguez et al. |
| 2018/0219861 A1 | 8/2018 | Schultz et al. |
| 2018/0248704 A1 | 8/2018 | Coode et al. |
| 2018/0287800 A1 | 10/2018 | Chapman et al. |
| 2018/0302743 A1 | 10/2018 | Bai et al. |
| 2018/0322587 A1 | 11/2018 | Linne |
| 2019/0007275 A1 | 1/2019 | Clemm et al. |
| 2019/0080189 A1 | 3/2019 | Van Os et al. |
| 2019/0098505 A1 | 3/2019 | Mars et al. |
| 2019/0124049 A1 | 4/2019 | Bradley et al. |
| 2019/0165943 A1 | 5/2019 | Chari et al. |
| 2019/0197430 A1 | 6/2019 | Arditi |
| 2019/0251526 A1 | 8/2019 | Jackson |
| 2019/0268332 A1 | 8/2019 | Wang |
| 2019/0289003 A1 | 9/2019 | Setchell et al. |
| 2020/0250896 A1 | 8/2020 | Vossoughi |
| 2020/0349557 A1 | 11/2020 | Jivraj et al. |
| 2021/0076212 A1 | 3/2021 | Manikantan Shila et al. |
| 2021/0158350 A1* | 5/2021 | Gaddam .............. G06Q 20/308 |

OTHER PUBLICATIONS

Michael Grabatin et al., "Reliability and scalability Improvements to Identity Federations by managing SAML Metadata with Distributed Ledger Technology", NOMS 2018—2018 IEEE/IFIP Network Operations and Management Symposium, pp. 1-6, Taipei, Taiwan.
Search Report dated Sep. 27, 2019 for PCT Application No. PCT/US2019/037553.

(56) References Cited

OTHER PUBLICATIONS

Keltoum Bendiab et al., "WiP: A Novel Blockchain-based Trust Model for Cloud Identity Management", 2018 IEEE 16th Intl, Conf. on Dependable, Autonomic and Secure Computing, 16th Intl. Conf. on Pervasive Intelligence and Computing, 4th Intl. Conf. on Big Data Intelligence and Computing and Cyber Science and Technology Congress, 2018, pp. 724-729, Athens, Greece.

David W. Kravitz et al., "Transaction Immutability and Reputation Traceability: Blockchain as a Platform for Access-controlled IoT and Human Interactivity", 15th Annual Conference on Privacy, Security and Trust, 2017, pp. 3-12.

Jong-Hyouk Lee, "BIDaaS: Blockchain Based ID As a Service", IEEE Access, 2018, vol. 6, pp. 2274-2278.

Tomas Mikula et al., "Identity and Access Management with Blockchain in Electronic Healthcare Records", 2018 21st Euromicro Conference on Digital System Design (DSD), 2018, pp. 699-706, Prague, Czech.

Ahmad Sghaier Omar et al., "Identity Management in IoT Networks Using Blockchain and Smart Contracts", IEEE International Conference on Internet of Things and IEEE Green Computing and Communications and IEEE Cyber, Physical and Social Computing and IEEE Smart Data, 2018, pp. 994-1000, HalifaAx, NS, Canada.

Paul Dunphy et al., "A First Look at Identity Management Schemes on the Blockchain", IEEE Security & Privacy, Aug. 6, 2018, vol. 16, No. 4, pp. 20-29.

\* cited by examiner

METHODS AND APPARATUS FOR AUTHORIZING AND PROVIDING OF DISTRIBUTED GOODS OR SERVICES

CROSS-REFERENCE TO RELATED APPLICATIONS

This application is a continuation-in-part application of U.S. application Ser. No. 16/717,973 filed Dec. 17, 2019, which is a continuation-in-part application of PCT App. No. PCT/US19/37553 filed Jun. 17, 2019, that is a non-provisional of and claims priority to U.S. Provisional App. No. 62/685,292 filed Jun. 15, 2018 and is a non-provisional of U.S. Provisional App. No. 62/789,063 filed Jan. 7, 2019. This application is also continuation-in-part application of U.S. application Ser. No. 16/717,951 filed Dec. 17, 2019, which is a continuation-in-part application of PCT App. No. PCT/US19/37553 filed Jun. 17, 2019, that is a non-provisional of and claims priority to U.S. Provisional App. No. 62/685,292 filed Jun. 15, 2018 and is a non-provisional of U.S. Provisional App. No. 62/789,063 filed Jan. 7, 2019. These references are incorporated by reference herein, for all purposes.

BACKGROUND

This invention relates generally to reader devices that communicate with multiple remote devices to facilitate authorization of users and to facilitate data transfer received from such remote devices.

Presently, attempts to create what the inventors refer to as a universal identification (ID) signal for an individual, have involved frameworks or underlying models in which the burden of implementing the signal—broadcasting it and ensuring that devices detect it—rests on the individual. This task of creating a personal signal, or what the inventors refer to as a transponder or beacon, is beyond the technical domain of the vast majority of users. This is one of the barriers that has prevented the growth of a universal identification signal for individuals, universal in the sense that the signal is not tied to or detectable only by a specific manufacturer, social media or network provider, or company.

One of the inventors' goals of a universal identification signal is to allow a user to identify and interact with a variety of physical world devices or objects by different manufacturers in a manner that allows for strict data control, security, and privacy. In contrast, current user ID models follow a "silo" model. In typical silo models, users emit a specific ID signal via a specific application on a specific device, such as from a smart phone, and the specific ID signal is only detectable by a specific entity, such as an appliance manufacturer, a car manufacturer, or online social media provider, or the like. The specific IDs are thus not universal, for example a Hilton user ID cannot be used for boarding a United Airlines flight. These siloed systems do not provide sufficient mapping to physical, real world environments and spaces that is needed to be useful, safe, and secure.

The inventors believe the silo model of user identification signals where each vendor, each hotel, each apartment, and the like is highly disadvantageous to users and more importantly to their smart devices. Some disadvantages include that the multiple applications take up large portions of the memory in smart devices, crowding out memory for photos, videos, other applications, and the like; another disadvantage is that when executing more than one of these silo applications, the performance of the smart device is impacted because there are large amounts of data that need to be cached for each of the programs, and switching between programs often become sluggish; another disadvantage is that having a large number of applications running at the same time can cause memory management problems in the user's smart device, causing crashes and other anomalous behaviors; and the like. Accordingly, the inventors believe the silo model often adversely affects the performance of smart devices.

There are some implementations, presently in limited use, that essentially leverage one online identity or profile to interact with various types of devices. Besides the security and data control/privacy concerns this raises, such single online personas do not truly reflect how individuals behave or act in the real, physical world. Human interactions with physical environments have developed over millennia, as such, it should not be expected that this behavior be reflected in online personas.

Other factors that have prevented universal or even quasi-universal signal technology from widespread adoption include generally a lack of motivation from manufacturers and companies to create their own apps, portals, back-end infrastructure, and so on, that would be needed to implement a signal or beacon framework with their customers. Again, this leads to a siloed approach that is simply not worth the expense and maintenance for many entities. Returning to the first point of placing too much of the technical burden of implementing universal signals on the users, it is certainly possible to create sensing points in an environment, but this framework requires that users modify their behavior, act in a different way and actually require that additional actions be taken by users. What is needed is a framework that does not require this of users and where the physical world or environment be essentially smarter and place minimal additional burden on the users to allow for seamless natural interactions.

The present invention relates to reducing the costs of transactional devices. More specifically, the present invention relates to reducing the amount of user financial transaction processed or stored upon such devices. By eliminating such data, transactional devices will be cheaper and require less hardware, because less customer data need to be stored; devices will provide quicker transaction response times, as fewer transactions need to be verified or cross-checked; devices will require less maintenance, and the like.

With typical electronic purchase of goods and services, users often provide sellers or service providers with sensitive financial account numbers and data. Such data may include credit card numbers, bank account numbers, debit card numbers, customer accounts, full names, residential and work addresses, telephone numbers, e-mail addresses, and the like. As users transact in multiple situations, e.g. their computers, mobiles devices, and even in-person, their sensitive financial data is shared with dozens if not hundreds of different providers.

Problems with this wide dispersal of sensitive data includes that the security of such data is often dictated by the provider with the lowest security. In other words, assuming that goods or service providers are constantly under attack by hackers, the provider with the least secure system will be the one through which users' sensitive data will leak out. With such user-sensitive data, hackers can open fake accounts, post charges to valid accounts, and in short, ruin users' lives.

Some weak tonic proposed by good or service providers whose databases have been hacked include payment for credit monitoring services, or the like. These solutions are not very effective, because it puts the onus upon the innocent parties, users and not the providers, to constantly monitor the users' credit history. Another problem is that although active credit monitoring can prevent new accounts to be opened, the users must be vigilant for life, as changing their names, addresses, telephone numbers, social security numbers, bank accounts, and the like are extremely time consuming and inconvenient.

The inventors of the present invention believe that more fundamentally, problems with current typical financial transactions includes the overly intrusive amount of information required by good or service providers. As an example, if a user goes to a bar for drinks and pays with a credit card or debit card, the bar will then know the user's name and the credit card number. As another example, if a user wants to purchase something on-line, for in-person pick up or service, the provider will know the user's credit card number, billing address, home telephone number, etc. Now of days users often resign themselves to the Faustian bargain of providing such sensitive information as part of the cost of convenience of using credit cards or other electronic payment systems. However, the inventors believe that such sensitive information should not be requested or freely given to good or service providers who do not need such data.

Some attempts to address the privacy aspects of transactions have included using specialized chips to encrypt and store encrypted data on a hardware level, and perform transactions with providers using the encrypted data. An example of this is the Secure Element portion in a near field communications (NFC) chip within Apple devices. In such cases, the Secure Element stores encrypted versions of the user's credit cards (Primary Account Number/PAN) using a service provider public key to form a Device Account Number (DAN), or the like. This DAN is then provided to the good or service providers devices (e.g. terminals, readers), and the transaction (including DAN, amount, and the like) is provided to a network to payment server for processing.

Issues with such solutions includes that it requires specialized and dedicated hardware for receiving secure communications on POS terminals and typically requires dedicated computer network connections, each increasing the costs of such payment environments.

SUMMARY

This invention relates generally to systems, methods and devices for first party identification and more particularly to systems, methods and devices for a universal ID. With embodiments of the present invention, storage memory of smart-devices is increased due to the reduced number of applications and programs that need to be stored, and the performance of the smart-devices is increased due to the lower number of applications required to operate simultaneously, while still providing the functionality desired by a user. In various embodiments, the reduction in demand on smart-device resources provide advantages to a smart device in terms of amount of free memory available for applications and the speed and efficient performance of applications running upon the smart device.

One aspect disclosed is a method of enabling a universal identifier signal, also referred to as a universal personal transponder (e.g. transceiver), using a beacon apparatus and a detector apparatus that performs as a scanner or sensor. In various embodiments, the beacon may be a smartphone, wearable device or other smart apparatus carried by a user, and broadcasts what is referred to as an ephemeral identifier.

This ephemeral ID is typically enabled by an application installed on the smartphone or smart apparatus. The ephemeral ID is then detected or sensed by a reader/detector device which may be constantly scanning the environment for ephemeral IDs and related data. In various embodiments, the detector can be built into a wide variety of devices, such as appliances, electronic equipment, public kiosks, controlled access points and the like. As described below, the detector device resolves the ephemeral ID to a user of a specific beacon apparatus, that is, the ephemeral ID is matched to a specific registered individual or user. A dedicated server, typically operated by a (e.g. universal) signal service provider, receives at least a portion of the ephemeral ID and verifies an access-control list (i.e. determines stored user data) associated with the specific registered user associated with the ephemeral ID. A first set of user data is then transmitted from the dedicated server to the detector device, such as a controlled access point (e.g. door lock, security door, turnstile, security system, elevator, gate), a coffee machine, kitchen appliance, TV monitor, point of sale device, loyalty card kiosk, automobile, appliance, vending machine, environmental controls, etc. The detector device then performs operations based upon the first set of user data, to enable substantive and meaningful interactions with the beacon (i.e., the user), such as unlocking a lock, turning on lights, registering the user, or the like. In some embodiments, the actions required by the beacon device are reduced or minimized and the majority of the operations are taken on by the reader/detector device. That is, the user and the user's smartphone does not need to perform any proactive operations or acts in order to have the user's universal ID signal be recognized by the door lock or have meaningful interaction with the door lock, such as unlocking the door for the user. In other embodiments, the beacon device may perform some of the access functions with the dedicated server automatically, without specific user interaction.

In another aspect of the invention, a system for implementing a universal personal transponder environment includes a beacon apparatus carried by a user that includes universal personal ID transponder software. The user enters an environment or space that has one or more scanner devices which are constantly scanning for a universal ID signal being emitted by the beacon by virtue of the transponder software. The detection of the universal ID signal occurs with minimal operations or actions needed by the user or the beacon apparatus. The software module on the beacon enables interaction with nearly any type of scanner device that has the necessary transponder software and hardware connectivity component. A dedicated server has a database for storing various types of data and multiple software modules for implementing the universal personal transponder environment. In some cases, the server may be operated and owned by a universal personal transponder service provider (SAAS) which operates the system for the benefit of the user and the scanner or detector device manufacturers or operators which may include a wide variety of device from door locks to electronic equipment. In other cases, the server may be operated and/or owned by a detector device manufacturer (e.g. controlled access point) and still be compatible with the universal ID signal from the universal ID software. In some embodiments, the majority of the processing and proactive steps needed to implement the environment is done by the scanner device which queries or monitors the beacon (e.g., smartphone) for ephemeral ID data, communicates with the server, and performs a responsive physical action. In various embodiments, the beacon also performs some steps to ensure security and authentication of the user via biometric scanner, password, or the like. In some embodiments, the burden of initiating the process and establishing a session is performed by the scanner device sensing the ephemeral ID.

According to one aspect of the invention, a method is described. One process includes scanning with a short-range transceiver in a first device for ephemeral ID signals within a geographic region proximate to the first device, and detecting with the short-range transceiver, an ephemeral ID signal output from a user device, wherein the ephemeral ID signal does not include personally identifiable information of the user. One method includes transmitting with a wide-area network communication unit in the first device, at least a portion of the ephemeral ID signal and a first identifier associated with first device to a remote server associated with the ephemeral ID signals and receiving with the wide-area network communication unit, a first reply from the remote server in response to the portion of the ephemeral ID signal and to the first identifier. One technique includes providing an electronic authorization signal to a first external unit coupled to the first device in response to the first reply, wherein the first external unit is configured to perform a first physical action in response to the first reply.

According to another aspect of the invention, a system including a first device is disclosed. In one apparatus, the first device includes a short-range transceiver configured to capture ephemeral ID signals within a geographic region proximate to the first device and configured to detect an ephemeral ID signal output from a user device, wherein the ephemeral ID signal does not include personally identifiable information of the user. In another apparatus, the first device includes a wide-area network interface configured to transmit at least a portion of the ephemeral ID signal and a first identifier associated with first device to a remote server associated with the ephemeral ID signals and configured to receive a first reply from the remote server in response to the portion of the ephemeral ID signal and the first identifier associated with first device. In yet another apparatus, the first device includes an output unit configured to provide an electronic authorization signal to a first external unit coupled to the first device in response to the first reply, wherein the first external unit is configured to perform a first physical action in response to the first reply.

According to one aspect, methods for a system are disclosed. One method may include broadcasting with a first short-range transceiver of a first reader system associated with a first provider, a first identifier to plurality of smart devices, including a first smart device, receiving with the first short-range transceiver of the first reader system, a first ephemeral ID from the first smart device, wherein the first ephemeral ID is not permanently associated with a first user of the first smart device, and providing with the first short-range transceiver of the first reader system, first transaction data comprising a first reader identifier associated with the first reader system, a first unique data packet, and a first indicator associated with a first transaction, to the first smart device. A process may include receiving in an authentication provider service a first identifier associated with the first smart device and the first transaction data from the first smart device, determining in the authentication provider service whether the first user of the first smart device is authorized for the first transaction in response to the first identifier, the first reader identifier, the first indicator, and a first set of policies specified by a third-party entity, wherein the third-party entity is independent of the first provider, and wherein the third-party entity is associated with the first user, and determining in the authentication provider service a first token in response to the first unique data packet, and in response to the first user of the first smart device being determined to be authorized for the first transaction. A technique may include receiving with the first short-range transceiver of the first reader system, the first token from the first smart device, determining in a first processor of the first reader system whether the first token is valid, in response to the first token, and directing with the first processor of the first reader system, a first peripheral device coupled to the first reader system to perform a first physical action in response to the first token being determined to be valid. Steps may include broadcasting with a second short-range transceiver of a second reader system associated with a second provider, a first identifier to plurality of smart devices, including the first smart device, wherein the second provider is independent of the first provider, receiving with the second short-range transceiver of the second reader system, a second ephemeral ID from the first smart device, wherein the second ephemeral ID is not permanently associated with the first user of the first smart device, and providing with the second short-range transceiver of the second reader system, second transaction data comprising a second reader identifier associated with the second reader system, a second unique data packet, and a second indicator associated with a second transaction, to the first smart device. Processes may include receiving in the authentication provider service the first identifier associated with the first smart device and the second transaction data from the first smart device, determining in the authentication provider service whether the first user of the first smart device is authorized for the second transaction in response to the first identifier, the second reader identifier, the second indicator, and the first set of policies specified by the third-party entity, wherein the third-party entity is independent of the second provider, and determining in the authentication provider service a second token in response to the second unique data packet, and in response to the first user of the first smart device being determined to be authorized for the second transaction. Methods may include receiving with the second short-range transceiver of the second reader system, the second token from the first smart device, determining in a second processor of the second reader system whether the second token is valid, in response to the second token, and directing with the second processor of the second reader system, a second peripheral device coupled to the second reader system to perform a second physical action in response to the second token being determined to be valid.

According to some aspects, a transaction system is disclosed. One system may include a first reader system coupled to a first peripheral device, wherein the first reader system is associated with a first provider, having a first short-range transceiver configured to output a first identifier to plurality of smart devices, including a first smart device, configured to receive a first ephemeral ID from the first smart device, wherein the first ephemeral ID is not permanently associated with a first user of the first smart device, configured to provide first transaction data comprising a first reader identifier associated with the first reader system, a first unique data packet, and a first indicator associated with a first transaction, to the first smart device, and configured to receive a first token from the first smart device, and a first processor configured to determine whether the first token is valid, and configured to direct the first peripheral device to perform a first physical action in response to the first token being determined to be valid. A device may include a second reader system coupled to a second peripheral device, wherein the second reader system is associated with a second provider, and wherein the first reader system is not associated with the second reader system, having a second short-range transceiver configured to output a second identifier to plurality of smart devices, including the first smart device, configured to receive a second ephemeral ID from the first smart device, wherein the second ephemeral ID is not permanently associated with the first user of the first smart device, configured to provide second transaction data comprising a second reader identifier associated with the first reader system, a second unique data packet, and a second indicator associated with a second transaction, to the first smart device, and configured to receive a second token from the second smart device, and a second processor configured to determine whether the second token is valid, and configured to direct the second peripheral device to perform a second physical action in response the second token being determined to be valid. An apparatus may include an authentication provider service configured to receive a first identifier associated with the first smart device and the first transaction data from the first smart device, configured to determine whether the first user of the first smart device is authorized for the first transaction in response to the first identifier, the first reader identifier, the first indicator, and a first set of policies specified by a third-party entity, wherein the third-party entity is independent of the first provider, and wherein the third-party entity is associated with the first user, configured to determine a first token in response to the first unique data packet, and in response to the first user of the first smart device being determined to be authorized for the first transaction, configured to receive a second identifier associated with the first smart device and the second transaction data from the first smart device, configured to determine whether the first user of the first smart device is authorized for the second transaction in response to the first identifier, the second reader identifier, the second indicator, and the first set of policies specified by the third-party entity, wherein the third-party entity is independent of the first provider, configured to determine a second token in response to the second unique data packet, and in response to the first user of the first smart device being determined to be authorized for the second transaction.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
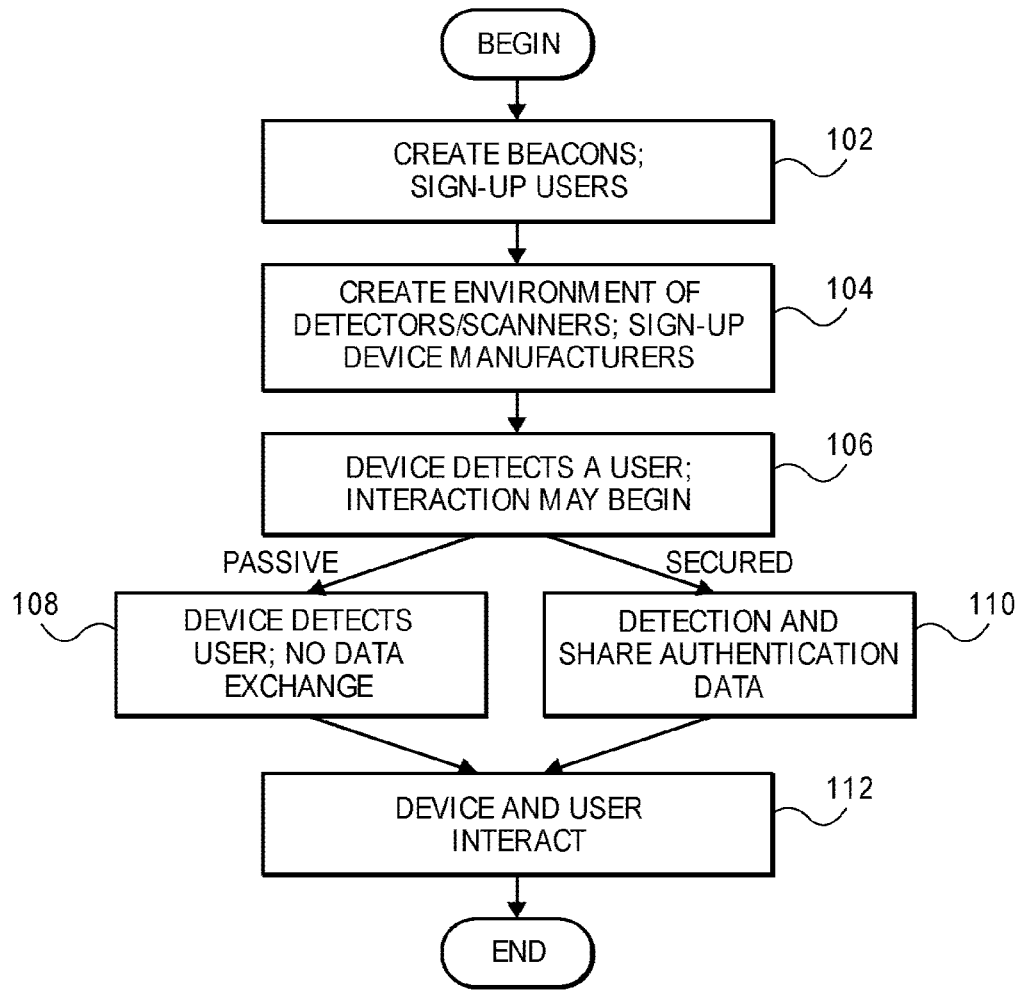
FIG. 1 is an overview flow diagram of a process in accordance with various embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the described embodiments as defined by the appended claims.

For example, methods and systems will be described in the context of creating, utilizing, and managing security and authentication for a universal, personal ID signal. In the following description, numerous specific details are set forth in order to provide a thorough understanding of the various embodiments. Particular example embodiments may be implemented without some or all of these specific details. In other instances, well known process operations have not been described in detail in order not to unnecessarily obscure the described embodiments. Various techniques and mechanisms will sometimes be described in singular form for clarity.

It should be noted that some embodiments include multiple iterations of a technique or multiple instantiations of a mechanism or technique unless noted otherwise. For example, a system uses a processor in a variety of contexts. However, it will be appreciated that a system can use multiple processors while remaining within the scope of the described embodiments unless otherwise noted. Furthermore, the techniques and mechanisms will sometimes describe a connection between two entities. It should be noted that a connection between two entities does not necessarily mean a direct, unimpeded connection, as a variety of other entities may reside between the two entities.

For example, a processor may be connected to memory, but it will be appreciated that a variety of bridges and controllers may reside between the processor and memory. Consequently, a connection does not necessarily mean a direct, unimpeded connection unless otherwise noted.

Various embodiments describe providing universal identity and physical presence detection in the form of a personal, universal signal. This signal allows a user to interact with devices in the user's environment without having to download vendor-specific apps, set up vendor-specific accounts or be limited to a siloed eco-system of a manufacturer brand. Such a personal universal signal representing an individual allows for devices and software to detect and query the beacon transmitting the signal for information relating to the user and augmented onto the physical environment. This provides a more personalized, efficient, and, in some instances, secure experience for the user.

The embodiments focus on reducing or minimizing user workload to allow for seamless interactions with her environment, such as, for example, the user being able to walk up to a TV anywhere in the world and having the TV (using the user's universal signal) detecting the user and querying for the user's personal preferences and accounts. The user can then, using voice commands, for example telling the TV to play their favorite TV show by saying "play Game of Thrones." The TV, using the user's authenticated universal signal can then access the user's personal preferences and accounts (e.g., Netflix account), and can then pull up the show and play it automatically. This can be done without the user using a specific app on the TV, setting up a TV specific account, logging into accounts, or owning the TV. In another example, a user can walk up to a door, and have the door automatically unlock for the user, once the user reaches a sufficiently close distance so that the user can passively walk through the door without having to do anything. In such examples, this is because the door sensed the user's universal signal ID, verified that the user has access to pass through the door and unlocks the door for the user. Again, this is done without the user being tied to the door manufacturer, or device, or to a specific account or app needed to serve such interaction. As such, the various embodiments provide and enable a universal signal for users and devices to interact, where all parties benefit from a seamless and natural way of interacting in the physical world.

Methods and systems for implementing a smart environment where a user's presence is sensed by a scanner are described in the various figures. In one embodiment, the environment is a physical space in which scanners detect the presence of a user via a universal identifier signal that is emitted from the user's mobile device which operates as a personal beacon. In this framework, the scanners perform most of the back-end operations and, for the beacon (e.g. a user's phone or watch), workload is significantly reduced. In this respect, by taking the burden of implementing the universal ID signal, the environment or physical space providing the framework may be described as intelligent or smart. The users simply need to do move around and behave normally. The devices around them in the space or environment they are moving in detects the users and the smart space performs the necessary communications and processing to realize the benefits described herein.

FIG. 1 is an overview flow diagram of a process in accordance with one embodiment. At step 102 an entity operates as a beacon and moves around in a physical space. In the described embodiment, the entity maybe a human being and the space can be any environment such as a home, an office, a retail store, a lobby, a public space, a sidewalk, to name a few examples. Another way to describe it is that an entity can be any object or thing for which a universal ID signal would be useful, such as a car, bicycle, or animal. At step 104 an environment or space in which at least one scanner operates is created. A scanner can be manifested or implemented in many ways. In the described embodiment, a scanner (also referred to as "device" herein; beacons, typically mobile devices, are referred to herein as "beacon" "user" or "smartphone") can be a home appliance, door lock, monitor, a car, a kiosk, a consumer electronic device, and so on. The type of devices found in an environment or space will naturally be dependent on the nature of the space. At step 104, manufacturers or other entities which either make the scanners or operate or manage them are signed up and registered to have scanners in the environment. A home will have different types of devices than a retail store or an office lobby, and so on. A common feature of most devices or scanners in the described embodiment is that they are generally stationary; they are not expected to move around in the physical space, but they can, and the inventive concepts described herein would still apply. At step 106 a device detects a beacon by virtue of the beacon signal and initial interaction between device and beacon may begin.

The initial interaction may be one of two types. One is referred to as passive interaction shown in step 108. Here the device detects the presence of a beacon signal. The device may not determine the identity of the user, that is, the user remains anonymous. In another passive mode embodiment, the user may be identified but only in a dedicated server operated, typically, by a service provider, described below, and not on the device itself. Although generally this back-end server will be online, in one embodiment the server, that is, the service provider, may be accessible without an Internet connection or being online (e.g., via Ethernet, Zigbee, and the like). This passive scanning or detecting presence of a beacon may be useful in various contexts, such as counting the number of people in a room or space, or whether someone just walked into a space. Essentially, the device wants to sense users around it, but the individual dictates the privacy. The user is the gatekeeper on his or her identity. The device that detects or sense the presence of the user may interact, it may do something, but that action does not have privacy concerns or require user authorization, hence, the passive nature of the interaction.

Another type of interaction that may be initiated is referred to as secured exchange where there is authentication of the user shown in step 110. Here tokens are used to authenticate and the device can make authorization requests. One example that illustrates this clearly is where the device is a door lock which detects the presence of a user and will only unlock if the user is authorized to open the door; the user must prove to the device (door lock) that she has access to open the door. In one embodiment, tokens are used to prove that the user is authorized. The beacon signal has at least one signed token from a back-end server that authenticates the user to the device. Once this authentication is made, the device will perform the relevant action and interact with the user. It may be noted that in either passive or secured exchange scenarios, the device may interact with the user as shown in step 112, but the level or degree of interaction will naturally vary.

Figure 2:
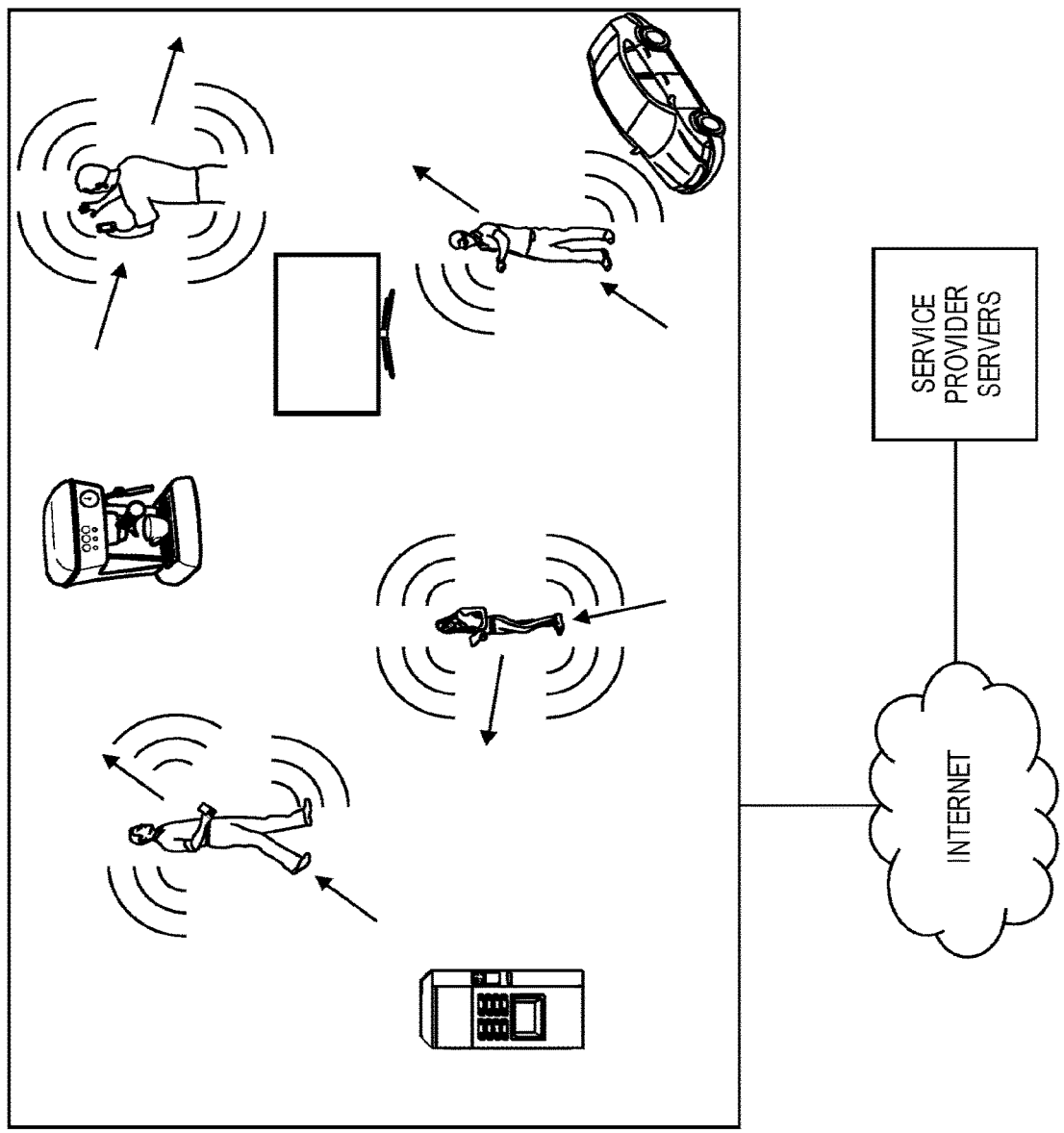
FIG. 2 is an illustration of a physical environment showing different types of devices and users with beacons.

FIG. 2 is an illustration of a physical environment showing different types of devices and users with beacons. Beacons can take various forms, most are Internet-enabled, but the most common are smartphones and wearables, such as watches or bracelets and may include bio-implants and other forms of personal mounted fixtures. As noted, the user will most likely be an individual, but may also be a moving object or an animal, such as a pet. Also shown are devices which can take on many forms, most are Internet-enabled. Devices may be home appliances and electronics, office equipment, ranging from refrigerators, coffee makers, door locks, TVs, vending machines, kiosks, cars, monitors, and so on. As described in greater detail below, a device may have its own server contained in it (to do universal signal actions) or may not need a service provider server at all. In the described embodiment the device accesses a service provider server to carry out some or all of the operations needed for the present invention. A service provider server, also referred to as the back-end server, is also shown. This server has numerous roles, but one of the primary ones is to authenticate the user and maintain access-control lists for beacons and devices. This back-end server is maintained and operated by the universal ID signal service provider which is responsible for implementing the universal ID signal and smart environment of the present invention. It provides a software module or app (application) that the user installs on her smart phone or wearable thereby enabling it as a personal beacon. And it provides software, hardware or both to device manufacturers and operators. For example, it can provide a software development kit (SDK) for the manufacturer or detector/scanning hardware, such as a Bluetooth module or sensor, if the manufacturer or device operator needs such a hardware component to put in their device. For example, a lock manufacturer may not have the technical means or desire to obtain the appropriate sensor desired for the invention so the service provider can provide the sensor hardware to them and instruct them on how to install it. The device manufacturer will decide what type of capabilities their device(s) will need when interacting with users and what type of security and authorization will be required from its users. It instructs the service provider on what data it needs from the beacon in order to interact securely and safely with its users.

Figure 3:
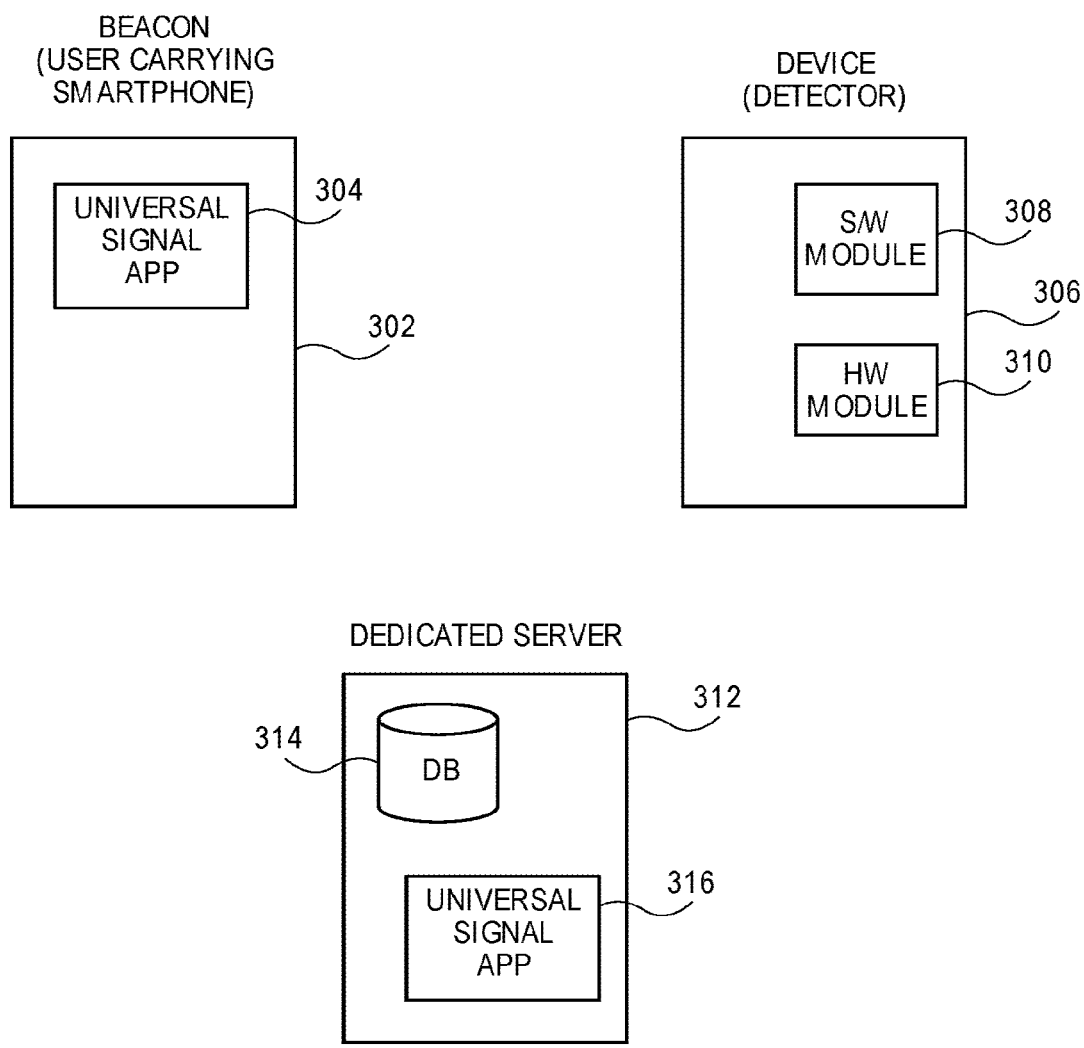
FIG. 3 is a block diagram showing some components for various embodiments of the present invention.

FIG. 3 is a block diagram showing three primary components needed for implementing various embodiments of the present invention. A user acts like a beacon 302. The user, in nearly all instances, a single individual (in some cases a "user" may be a group of people like a family, a group of co-workers, a team, etc.) carries an apparatus that acts as the beacon. As noted, this can be a smartphone, bracelet, watch, or any suitable wearable device. Beacon 302 has installed on it a service provider software module 304, that implements the personal universal ID signal of the present invention.

A device 306 acts as the detector or scanner in the environment. As described, device 306 can take the form of one of a multitude of objects from ranging from appliances to electronic equipment to public vending machines. Nearly all have a software module 308 that is provided by the service provider and installed either by the provider or by the manufacturer. Software module 308, as well as module 304, performs many of the operations described in the flow diagrams below. In some embodiments, device 306 may also have a hardware component 310, such as a Bluetooth component or other hardware needed for connectivity (e.g. transmitter and receiver) with beacon 302 or with a dedicated server, the other component in FIG. 3. This hardware component may be provided by the service provider.

A service provider server 312 is operated and managed by the universal ID signal provider and may have extensive software modules, such as the universal signal app 316, and at least one database 314 which stores data on beacons (users), devices, access control tables, and a wide variety of data needed to implement the universal signal environment of the present invention.

Figure 10:
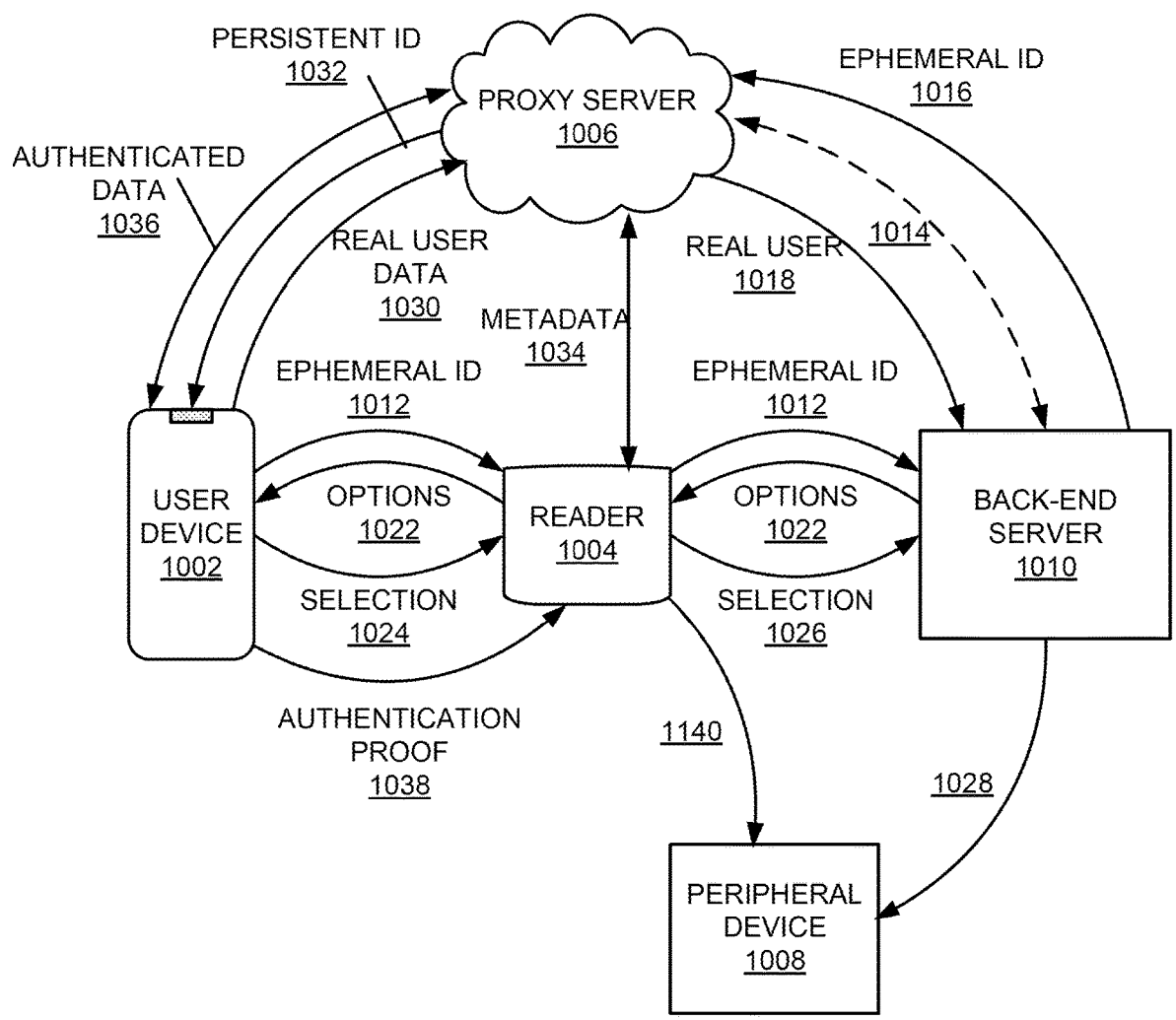
FIG. 10 is a block diagram of a process according to various embodiments of the present invention.

FIG. 10 illustrate a logical flow diagram illustrating the process described below in FIGS. 4A and 4B and FIG. 5. In FIG. 10 systems are illustrated including a user device (e.g. a smart phone, smart watch, ring, tablet, wearable device, augmented reality glasses) 1002 coupled to a reader 1004 and to a cloud-based server 1006, and a peripheral device 1008. In FIG. 10, a peripheral access control system (PACS) 1010 is also illustrated coupled to cloud-based server 1006 and to peripheral device 1008.

Figure 4A:
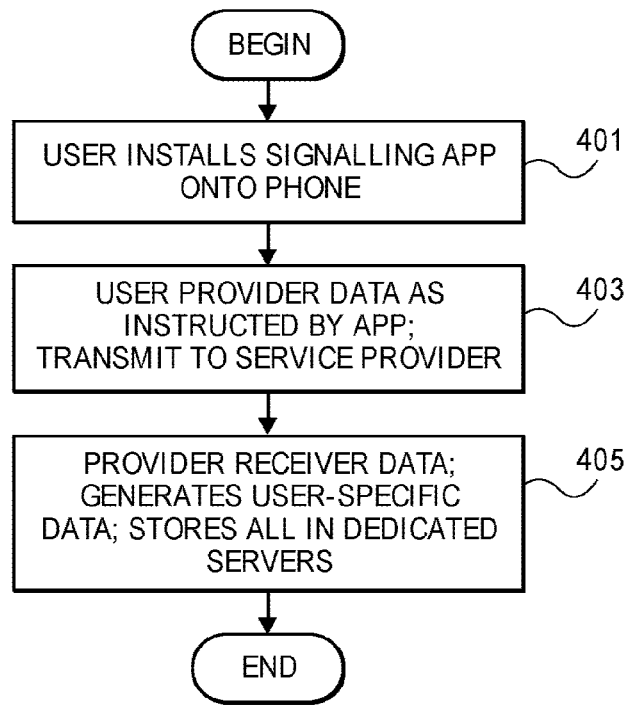
FIG. 4A is a flow diagram of a process of a user joining the universal ID signal framework as implemented by a service provider in accordance with some embodiments.

FIG. 4A is a flow diagram of a process of a user joining the universal ID signal framework as implemented by a service provider in accordance with one embodiment. A user, typically an individual, has decided to join the universal ID signal framework. In one context, an employer may ask all of its employees to join so that the advantages of the universal signal can be realized in an office or company campus environment. The first step taken by the user is shown at step 401 where the user downloads a service provider universal ID signal app ("app") onto her smart phone 1002 or wearable apparatus (for ease of explanation, collectively referred to as "smartphone"). Generally, the app can operate in most widely used personal devices, platforms or operating systems, such as Android, iOS, and others that run on phones, watches, bracelets, tablets, bio-chips and the like. The application may also be termed a security application that runs upon the user's smart device.

Once downloaded and installed, at step 403 the user enters 1030 at least some required basic information about herself. In various embodiments, transmissions between user device 1002 and server 1006 are typically rf communication using Wi-Fi, cellular service (e.g. 4G, 5G, etc.), or the like. Some of the information can be entered at a later time depending on the apparatus that the app is being installed on. In one embodiment, a subset of the data entered by the user results in the creation of various identifiers. One may be referred to generically as a unique ID whose use is limited in that it is used primarily, if not only, by the service provider. This unique ID is not sent to the device, such as an appliance, door lock, coffee machine, etc. Another is a randomly generated identifier, referred to herein as a temporary or ephemeral ID. In some embodiments, the ephemeral ID may include random data, pseudo random data, or data selected from a predetermined set of data. In one embodiment, a portion of the ephemeral ID is provided 1032 to device 1002 and the full ephemeral ID may be generated within user device 1002 based upon the portion of the ephemeral ID from server 1006. In other embodiments, the ephemeral ID may be generated fully within user device 1002 based upon data specified by the app running upon the user device 1002 (e.g. data that identifies to reader 1004 that the ephemeral ID is broadcasted from the app on the user's smartphone. As described above, the ephemeral ID may be combined with random, pseudo random, or data selected from a set of data, or the like ("random"). In some embodiments, ephemeral ID may include at least a first portion including the "random" value and a second portion that includes data that authenticates the ephemeral ID as being authorized by server 1006. In some examples, the authenticating data may be a digitally signed message that reader 1004 may verify itself or with back-end server 1010 and server 1006, a private-key encrypted message that reader 1004 may decrypt itself or via a paired public-key via back-end server 1010 and server 1006, or the like. This ephemeral ID, for example, may be used for anonymous detection by a device of the user.

Another identifier created from the user data and provided to 1032 user device 1002 is referred to as a persistent ID, an ID that can be characterized as stable and is created for each user/device manufacturer pair. For example, a user may have different persistent IDs for her relationship with the monitor, another for her relationship with the coffee machine, the car, the door lock, and so on. Each device manufacturer gets a distinct persistent ID for each user (assuming one device from each manufacturer). It may be described as a persistent or permanent version of an ephemeral ID. At step 405 the data entered and created at step 403 is stored in service provider 1006 or manufacture's own dedicated servers 1010, in most cases this will be the service provider servers.

Figure 4B:
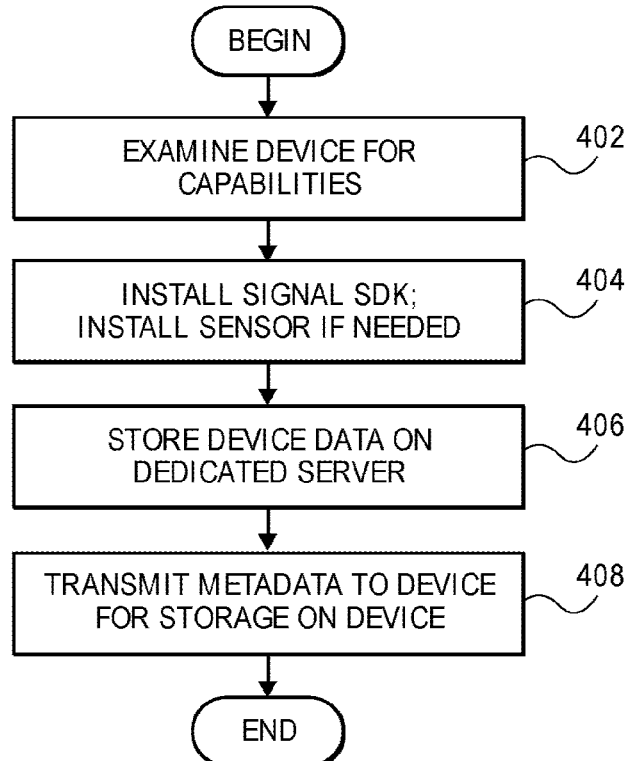
FIG. 4B is a flow diagram of a process of registering and initializing a device so that it can be a universal ID signal sensing device in a physical space in some embodiments.

FIG. 4B is a flow diagram of a process of registering and initializing a device so that it can be a universal ID signal sensing device in a physical space in accordance with one embodiment. At step 402 the service provider determines whether the device has the necessary hardware for being a scanner as needed for implementing the present invention (since the device is new to the space and universal ID framework, the service provider knows that the device does not have the universal ID app yet). The service provider obtains a wide variety of data and metadata about the device, items such as device name, category, location, identifier(s), make, model, time zone and so on. Some of this data is used to let the user know what the device is exactly when she encounters it in a physical real-world space and wants to decide whether to interact with it. However, the threshold question determined at step 402 is whether the device has the right hardware. If it does, the service provider only needs to supply and install universal ID signal software which, in the described embodiment, is in the form of a software development kit (SDK) as shown in step 404. If the device does not have the right hardware for scanning (some smaller scale manufacturers may not have the means or technical skills to include this hardware in their product) the service provider provides one. In this case the software module and the sensor hardware are installed on the device which may be done by the device maker or the service provider.

At step 406 information describing the device is stored by the service provider in a database. This data may be used for enabling interaction between the device 1004 and the beacon 1002. In some scenarios, the data for this interaction may be stored on the device itself wherein the service provider does not play an active role. Some examples of data stored include device ID, single key, private/public key pair, set of commands and interactions, actions the user or device can take, a template which can be customized for different devices. In one embodiment, a template may be described as a pre-defined schema of attributes and metadata. In a simple example, a template for a door lock can have "lock" and "unlock" whereas a template for a car would likely have many more options. At step 408 metadata describing to the device and templates are transmitted 1034 to the device and stored there.

At the end of FIG. 4B, the device is now capable of detecting or sensing a beacon 1002 when a beacon with the universal ID signal app executing on it is in the presence of the device 1004. FIG. 5 is a flow diagram of a process of passive detection of a universal signal presence in accordance with one embodiment. With continued reference to the example in FIG. 10, in FIG. 5, at step 502 a user (as noted, the term "user" is interchangeable with "beacon" and "smartphone" 1002) enters an environment or physical space that has scanning devices, e.g. 1004. It is important to note here that the user is in control of her personal universal ID signal. The user can turn the signal on (by executing the app downloaded at step 401) or not turn it on. There are also measures that can be taken to ensure that the universal signal is coming from the right individual and not an imposter or some other intentional or unintentional unauthorized person. At step 502 the user turns on the signal via a smartphone or wearable apparatus 1002 once another factor has passed. For example, the signal turns on only after a smart watch has detected the user's heart pattern or other biometric means to verify the identity of the user wearing the watch or carrying the smartphone. Only at this point is the signal turned on. This prevents other individuals from impersonating the user by wearing the user's smart watch or other wearable. At step 504 a beacon 1002 in the environment broadcasts 1012 the ephemeral ID. In some embodiments, transmissions between beacon 1002 and reader 1004 may be performed via short-range communications, such as BLE, Zigbee, NFC, or the like. At step 506 a device 1004 detects or senses the beacon 1002 and reads the beacon's ephemeral ID. A non-persistent minimal connection is established initially between the beacon and the device. The universal ID signal app does not tie up the device exclusively (unlike other IoT devices). Because of the non-persistent nature of the connection some typical scaling issues are avoided. No permanent bonding or tie-up is needed in the personal universal ID signal implementation and framework of the present invention.

Steps 502 to 506 describe what can be referred to as a sub-process for ambient sensing of the beacon 1002 by a device 1004. It may be characterized as the simplest use case scenario for the universal ID signal. Ambient sensing can be used in scenarios where users simply have to be distinguished from one another, such as counting how many users are near a device or in a room. This ambient sensing may also be seen as a way for a user to potentially communicate with a device if needed. As illustrated in FIG. 10A, if communication 1014 is possible and the dedicated server, such as a service provider server 1006, can be accessed, the process continues with step 508. In another embodiment, the dedicated server 1006 can be accessed via another communication means, such as Bluetooth, Ethernet, and the like. At step 508, the service provider server 1006 learns private data about the user. It does this by taking 1016 the ephemeral ID or persistent LI and resolving it to a persistent ID or an actual or real user identifier 1018 (as noted, prior to this step, the user was merely an anonymous but distinguishable entity). At step 512 the back-end 1010 receives and verifies permissions attached to the user by examining an access control list. At step 514 the back-end 1010 sends 1022 user data (e.g. options) based on the access control list to the device 1022 via reader 1004, in other words, it sends 1022 to the device 1002 only data about the user that the device 1002 is allowed to see (e.g. options available to the user of device 1002 such as user transaction history, user account status, amount of stored-value remaining, etc.). In some examples, where a peripheral device 1008 is a controlled access point 1008 (e.g. door), an option available may be to unlock or unlatch; where peripheral device 1008 is a television, an option available may be to select from a list of subscription services. In some embodiments, an option may be manually selected by the user on device 1002 and the selection may be sent 1024 to reader 1004, whereas in other embodiments, if there is one option or a default option, the option need not be sent, or the option may automatically be selected by device 1002 and sent back to reader 1004.

In various embodiments, reader 1004 may send 1026 the selected option to back-end 1010, and if authorized, back-end 1010 directs 1028 peripheral device 1008 to perform an action. In the example where peripheral device 1008 is a door, the instruction may be to activate a solenoid, or the like, in a strike plate and allow the user to pull or push open the door; in the example where peripheral device 1008 is a television, the instruction may be to run a Netflix application on the television and to log into Netflix using the users credentials, for example; and the like. In various embodiments, the back-end 1010 stores a matrix of permissions, policies, preferences, and the like regarding users and devices. In one embodiment, it uses the user's persistent ID which, as noted, is particular to that user and a specific device pairing.

In some embodiments, if communication 1014 is not possible in real-time, resolving ephemeral ID may be performed via the transfer of server-authenticated data by smart phone 1002 to reader device 1004, described below, and/or may be performed via the transfer of signed tokens from server 1006 to smart device 1002 described in FIG. 6.

Returning to step 506, if there is no ephemeral ID or the data needed is already on the device, characterized as a "local only" option, the data needed for sensing the beacon 1002 is on the device 1002 itself and user data is requested from the device instead of from a service provider server.

Figure 5:
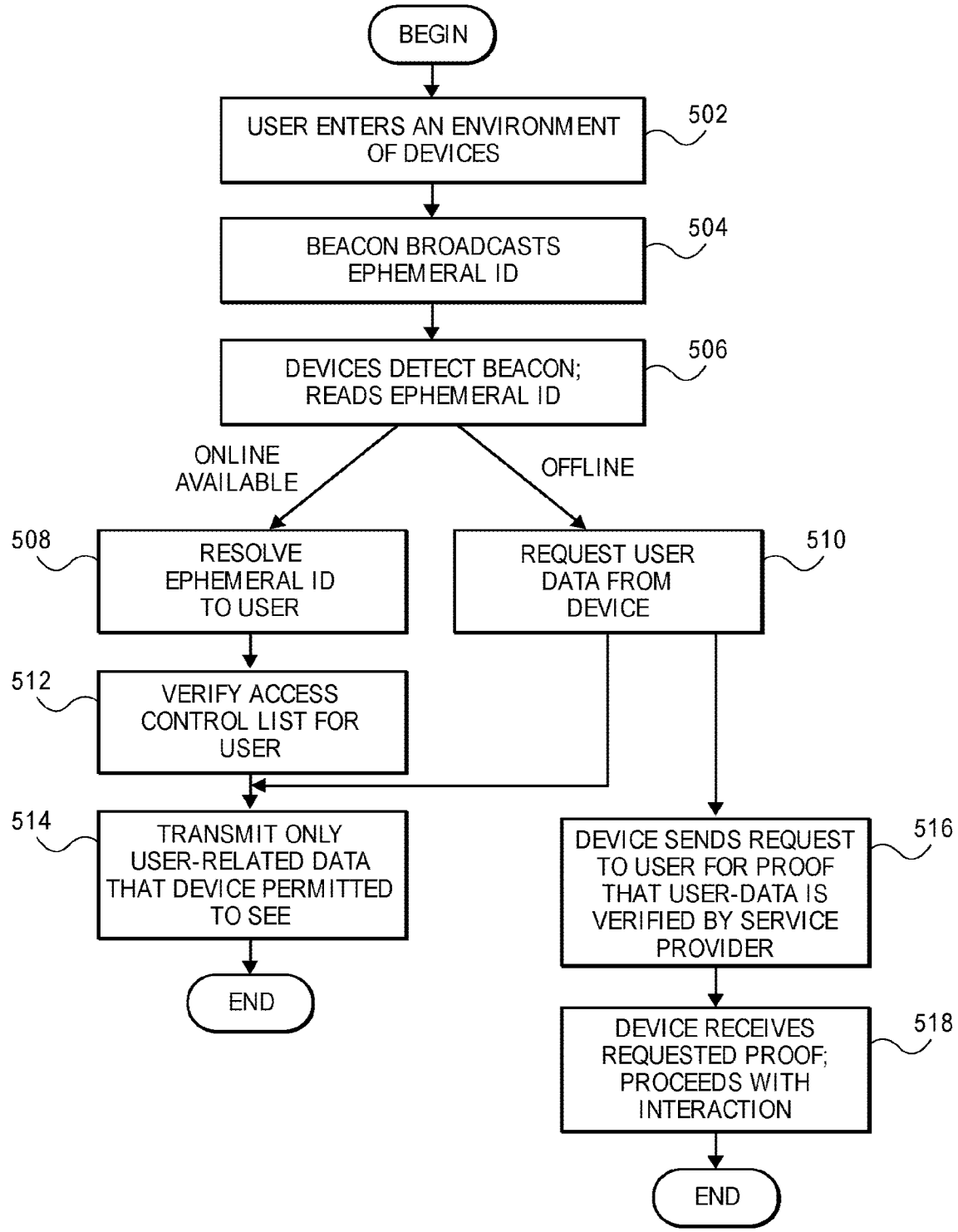
FIG. 5 is a flow diagram of a process of passive detection of a universal signal presence in accordance with some embodiments.

The passive branch shown in FIG. 1 has been described in FIG. 5 steps 502 to 514. Steps 510, 516, and 518 illustrate the secure branch from FIG. 1. As noted, at step 510, in the "local only" step, when the device 1004 (or back-end server 1010) does not access service provider servers 1006 via the Internet, user data is requested from the device. Steps 516 and 518 are needed because the service provider 1006 is not able to authenticate user data (e.g. ephemeral ID or any type of data from the smartphone 1002. The perspective of the queries and actions taken in steps 516 and 518 are from the device 1004 perspective. At step 516 the device 1004 or, more specifically, the universal ID signal software module on the device, needs to be able to verify that data it is receiving from the beacon 1002 at some point has been verified by the service provider 1006 and is still valid. The device 1004 wants to see that the data (the data basically conveying, for instance, "I am John Smith's smartphone") has been vouched for by the back-end server, but that the authentication and identity data the device 1004 receives has been verified. In one embodiment, this is done without using any of the IDs described above (ephemeral, persistent, unique, etc.). Instead data used to verify the identity depends on the scanning device 1004. For example, the data could be an authenticated version 1036 of the user's driver license, or verification of the user's voice or face recognition as matched with a known hash of the user's voice recording or facial image (for example, stored on the user's smartphone) of the user as biometric authentication that the user is the correct, intended user. The authentication may be performed by cloud server 1006, or may be performed by cloud server 1006 in conjunction with a dedicated authentication server. Once the device 1004 receives 1038 this proof or is otherwise confident that the data it is receiving is authentic, control goes to step 518. Here the device receives proof from the smartphone that the user identity data is authentic and that the device 1004 can request performance 1028 of the action by peripheral device 1008 via server 1010, or in alternative embodiments, device 1004 can request 1140 performance of the action directly with peripheral device 1008. As described herein, actions may include unlocking a door, turning a TV on to the user's preferred channel, or make coffee how the user likes it.

Figure 11:
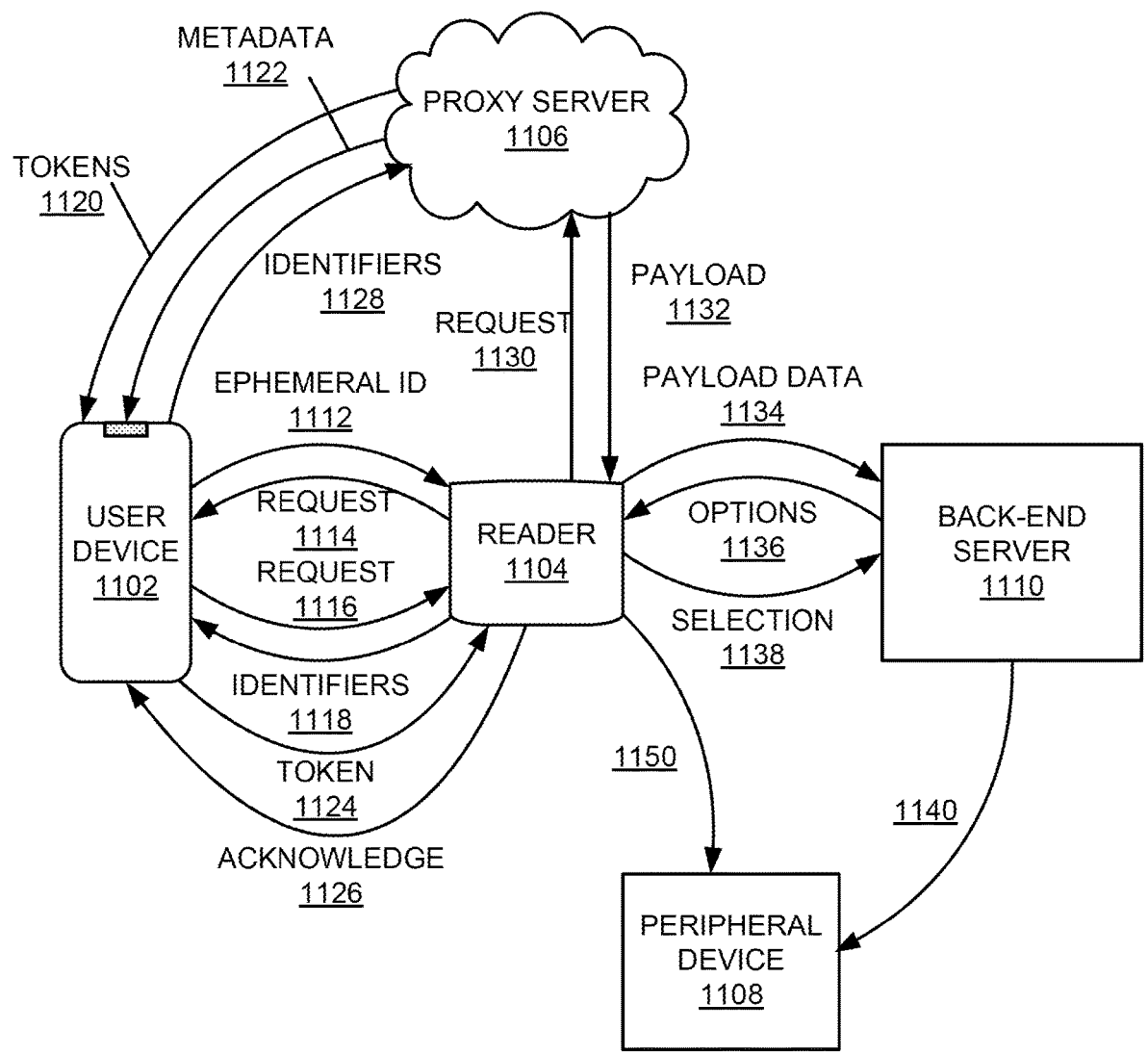
FIG. 11 is another block diagram of a process according to various embodiments of the present invention.

FIG. 11 illustrate a logical flow diagram illustrating the process described below in FIGS. 6-8. In FIG. 11 systems are illustrated including a user device (e.g. a smart phone, smart watch, ring) 1102 coupled to a reader 1104 and to a cloud-based server 1106, and a peripheral device 1108. In FIG. 11, a peripheral access control system (PACS) 1110 is also illustrated coupled to peripheral device 1108.

Figure 6:
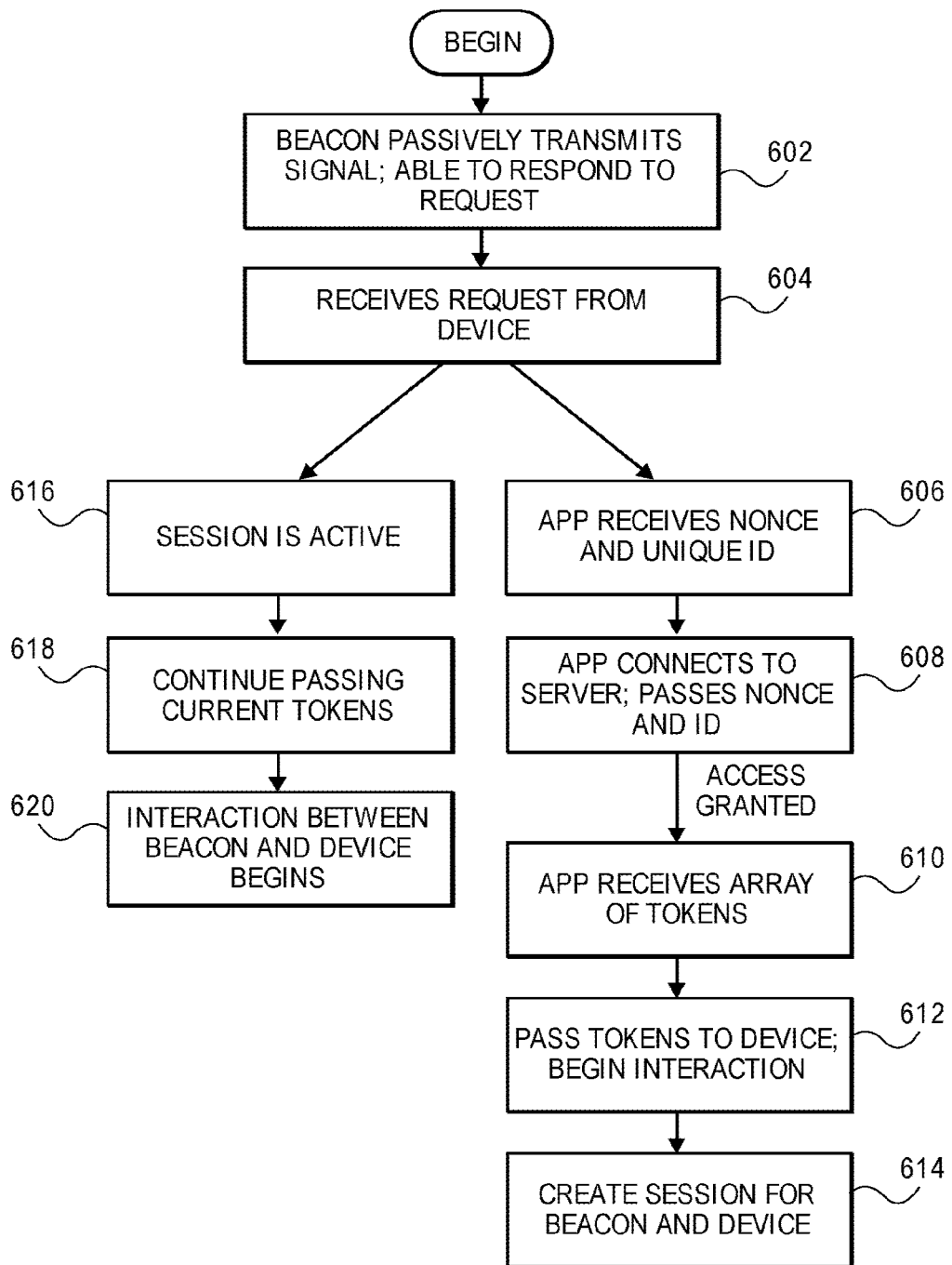
FIG. 6 is a flow diagram of a process of transmitting a universal ID signal between a beacon and a device and initiating interaction between them in accordance with some embodiments.

FIG. 6 is a flow diagram of a process of transmitting a universal ID signal between a beacon 1102 and a device 1104 and initiating interaction between them in accordance with one embodiment. At step 602 the smartphone or wearable 1102 being carried by a user has entered a physical space with universal signal-enabled devices 1104 and is passively transmitting 1112 a universal (ephemeral) ID signal. In some embodiments, transmission 1112 may be performed via short-range communications, such as BLE, Zigbee, NFC, or the like. Similarly. In one embodiment, this is done by the app in the background essentially when the beacon 1102 apparatus is powered on. In other embodiments, the app can be terminated or, in contrast, be in the foreground, and be transmitting a universal, personal ID signal. In various embodiments, reader 1104 may determine whether the ephemeral ID is in the proper format. If not, reader 1104 may ignore it, and if so, reader 1104 may generate a request. In some embodiments, the app is also able to detect a request 1114 from a device 1104 and respond. Although the beacon 1102 has the universal ID signal app from the service provider 1106, it does not need anything from the device 1104 manufacturer in order to receive the request from the device 1104 or respond to it. As noted above, the invention bypasses any form of a "silo" arrangement or framework. The sensors in the devices that are scanning can connect to the beacons.

At step 604 the beacon 1102 receives 1114 a request from the device. The app is able to either recognize the request or not. If it does not recognize the request from the device 1104 or has not seen a request from the device 1104 for a long time (a time exceeding a predetermined threshold), control goes to step 606. In various embodiments, device 1104 may determine whether a session is active based upon identifying information from user device 1102. For example, device 1104 may determine whether portions of the ephemeral ID 1112 are cached within device 1104. The ephemeral ID may be cached by device 1104 in step 614, described below, when a session is initiated.

In some embodiments, if there is no active session, the app requests 1116 a non-repeatable value or nonce from the device and a fixed unique ID for that device. In some embodiments, the nonce may be random data, pseudo random data, or data selected from a predetermined set of data. In other embodiments, this ID can come from the service provider server or through other means, such as through an ID tag via near-field communication or an iBeacon associated with the device. In other embodiments, in response to the transmission 1112 of the ephemeral ID, reader 1104 may provide 1118 the identifiers. At step 606 the app receives 1118 these values. At step 608 the app 1102 connects to the service provider server 1106 and transmits 1128 these two values to the server 1106. In various embodiments, transmissions between user device 1102 and server 1106 are typically rf communication using Wi-Fi, cellular service (e.g. 4G, 5G, etc.), or the like.

In some embodiments, assuming the server 1106 is able to identify the unique ID as belonging to the device 1104, and assuming the user of device 1102 is authorized, server 1106 grants access between the device 1104 and the beacon 1102. The server 1106 uses the nonce for deriving a token as described below. More specifically, it enables access control and security by transmitting 1120 an array of tokens to the smart phone 1102, the server 1106 cannot recognize the device from the ID or determines that there is no interest from the user in accessing or interacting with the device, then tokens are not passed to the smartphone. In some cases, metadata may be passed 1122 to the smartphone which provides publicly available, insecure information related to the device such that the user can act on the information (e.g. options). For example, the device 1104 may be a public device, such as a kiosk or parking meter, and although most of the time the user is likely to ignore the device, if the user wants to learn more about the device (e.g., remaining parking time or rate), the user would be able to do so with the data returned by the dedicated server. In one embodiment, a token has one component that is derived from combining the nonce, the unique device ID, device-specific data, time-limited data, user restrictions, and so on. In one aspect of the present invention that communications between the device 1104 and user 1102 be secure. All the values and factors that go into making the token play a critical role in making the entire universal ID signal framework secure.

The second component of a single token is referred to as a payload section and contains data on user preferences and generally to the user and device. In one embodiment, each token in the array is valid for a limited time period, such as for a few minutes, hours, or days. An array may have a few hundred tokens and can be used to prove validity from a few hours to several days. For example, for commercial building access, a token may last for 4-5 hours and be replenished often to ensure that there are tokens to last the user through the day.

In another embodiment, where access to a service provider server may not be available, tokens can be generated on a device, such as a lock, using other factors, such as biometrics fingerprint, voice recognition, face recognition or retina scanner part of the device, geo-location, expiration time, and so on. These features can also be used even if there is access to the service provider server to provide stronger security. As is known in the art, a token is a signed data item, intended to be used once and discarded (as does an entire array of tokens). Getting back to the importance of security in a universal ID signal framework, the array of tokens that is sent 1120 from the service provider server 1106 to the smart phone 1102, together with other security features, prevents possible hacking and malfeasance, for instance, "replaying" or emulation (harmful devices emulating valid, authorized devices), among others.

At step 612 the app passes 1124 one of the tokens from the array or the entire array of tokens to the device 1104. In some embodiments, the token may pass 1124 via BLE, and in other embodiments, the token may pass via other channel (e.g. NFC, or the like). The device validates the tokens and interactions between the user and the device can begin. More specifically, the universal ID signal software module on the device 1104 validates the tokens and sends 1126 a message to the smart phone stating that they can now communicate. Upon receiving this message, at step 614 the beacon creates a session and the two can now interact. As disclosed above in FIG. 10, the session may include communicating options available, receiving user selections, and the like.

Returning to step 604, if the beacon 1102 app recognizes the request 1114 from the device 1104, control continues with step 616 where a session between the smartphone and the device is already active. As discussed above, determining whether a session is active may be performed based upon cached data within device 1104 (e.g. another token, a MAC address of user device 1102), the ephemeral ID 1112 provided by user device 1102, a challenge and response between device 1104 and user device 1102 based upon a key from a token, or the like. This session may be the same type as the one created at step 614.

The array of tokens may be stored in a cache or local storage on the smartphone. By doing so, the smartphone 102 does not have to be online; it can be offline and operate fast. At step 618 the smartphone continues passing 1124 tokens to the device. The smartphone keeps the tokens for a predetermined amount of time, a threshold of time that balances security and user convenience, for example, a few hours. After that time has expired, the app on smart phone 1102 gets a new array of tokens from the service provider 1106. If they have not expired, the smartphone can keep using the tokens in the array. At step 620 the interaction between the user 1102 and the device 1104 can resume. In this manner, that is by executing the operations in steps 604 to 614 or steps 604, 616, 618, and 620, a secure, truly universal ID signal that is usable by many different types of devices (from various manufacturers) and users can be implemented.

Figure 7:
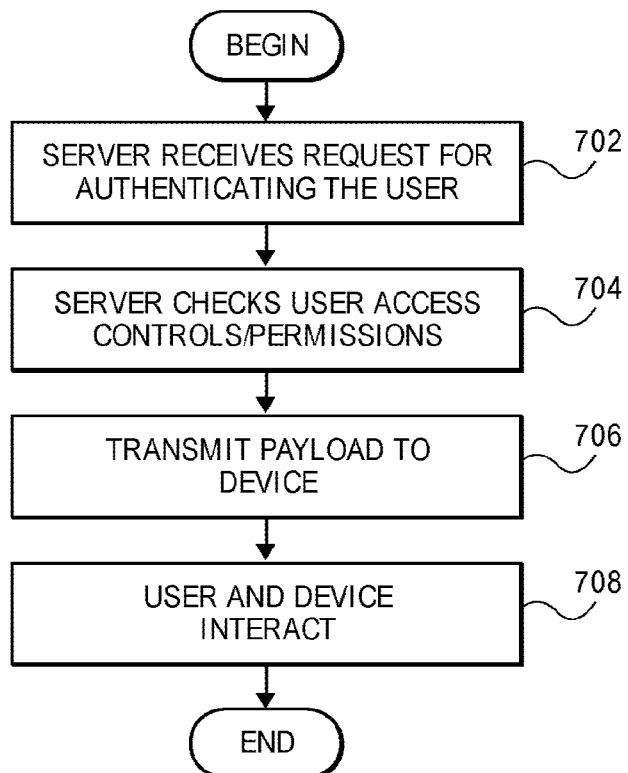
FIG. 7 is a flow diagram of a process of operations that occur on the device when the device is online in accordance with some embodiments.

FIG. 7 is a flow diagram of a process of operations that occur on the device 1104 when the device 1104 is online in accordance with one embodiment. At step 702 the service provider server 1106 receives a request 1130 from a device, for example a car or an appliance, for authenticating a user 1102. It is helpful to note that a device 1104 can only see users who have allowed that specific device to recognize or see them (a category of devices or a specific manufacturer or member group may also be specified). Similarly, in some physical environments, such as a workplace or other secured area, a user is only allowed to see devices that an overseeing entity (e.g., employer) says she is allowed to see or recognize. Such embodiments may be based upon identifiers that are transmitted 1118. If the user device 1102 is not allowed to recognize a reader 1104, based upon the reader's identifiers, the communication may terminate. In other contexts, a device maker may only want users with certain features or characteristics to be able to see or recognize its devices. Various types of scenarios are possible in which either the user or the device maker or owner, manager, and the like can set security protocols regarding who or what can be recognized using the universal ID signal. For example, one benefit of this type of security is that it prevents the equivalent of spamming on both sides. In all scenarios, the underlying security principle that is implemented in the various embodiments of the invention is that either side-user or device-only gets to see and receive what it needs to in order to interact and can only get to that point if the user or device is authorized to see the other. At step 704 the service provider server checks user access controls to see if the user is authorized to use the device and if so what controls or limits are there. There are different techniques or transport mechanisms for how this user access control check can be performed by the service provider. For example, in one embodiment, there may be an out-of-band token exchange or a token server. The common factor is translating the random, non-identifying ID (e.g. ephemeral ID) for the user that was transmitted 1112 initially to the device 1104 into a full set of information about the user. This information can be used in a permission check process. At step 706, assuming the user is authenticated, the service provider server transmits 1132 the payload to the device 1104 so now the device knows the user's preferences, permissions, interaction history, and other information. At step 708 the user 1102 and device 1104 can begin substantive interaction.

Figure 8:
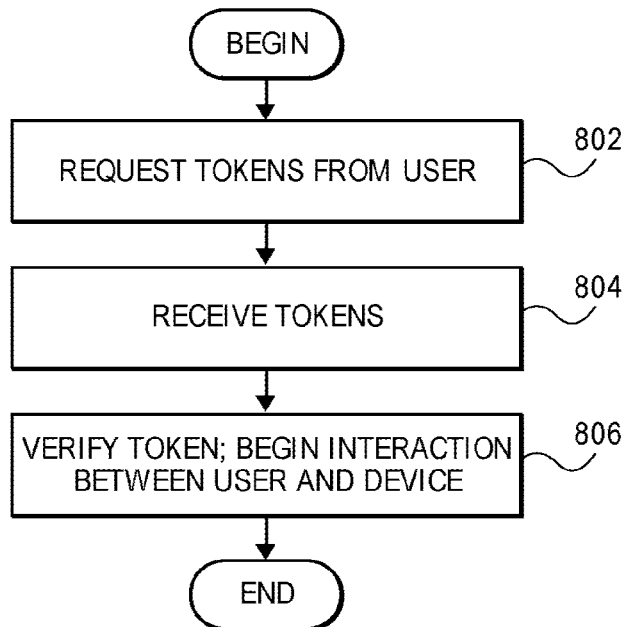
FIG. 8 is a flow diagram of a process that occurs on the device when the device is offline in accordance with some embodiments.

FIG. 8 is a flow diagram of a process that occurs on the device when the device is offline in accordance with one embodiment. The end goal of this process is essentially the same as that of FIG. 7, except here the device 1104 does not communicate with the service provider server 1108. At step 802 the device makes a request 1114 for an array of tokens from the user. The nature and characteristics of this array of tokens are the same as the token array described above. At step 804 the device 1104 receives 1124 a token from the beacon 1102. At step 806 the device 1104 proceeds with verifying the token using only local resources. In various embodiments, it can verify or check the signature in the tokens, it can check to ensure it has not expired or has not been used before. Through these means and others, if available locally, the device authenticates the user and interaction between the user (who may or may not be online) and the offline device can begin. As discussed above, this may include providing 1134 payload data associated with the user and user device 1102, (e.g. a persistent ID, an employee badge number, a store loyalty card, an account number, a stored-value card number, a credit or debit card, telephone number, email address, etc.) that is stored within the token to back-end server 1110.

As noted above, with regard to security, one notable aspect of that is embedded in the validation period of a token. This period can vary from a few minutes to several weeks. A token for a coffee machine may last 20 days whereas for a lock or for making payments, a token may expire after one hour. This security feature is typically set by the device manufacturer; they decide how long to wait before a user has to re-authenticate with the device. Generally, users will have little input in this regard. Another scenario not described in FIGS. 7 and 8 is when the device 1104 and smartphone 1102 are both unable to reach a service provider 1106 or dedicated server and have not connected or interacted with each other before. In this scenario, even though the smartphone has the universal ID signal app and the device registered with the service provider, there is no recognition of each other, let alone any interaction.

In various embodiments, if a back-end server 1110 is used, as described above, options may be provided 1104 to device 1104 and to smart phone 1102, and in response back-end server 110 may receive 1138 a user selection of an option. Back-end server 1110 may then instruct or cause 1140 peripheral device 1108 to perform an action for the user, as discussed above, such as to unlock a door, control a television, provide a product (e.g. a vending machine), etc. In other embodiments, if a back-end server 1110 is not used, device 1104 may directly instruct 1150 peripheral device to perform the action.

Figure 9:
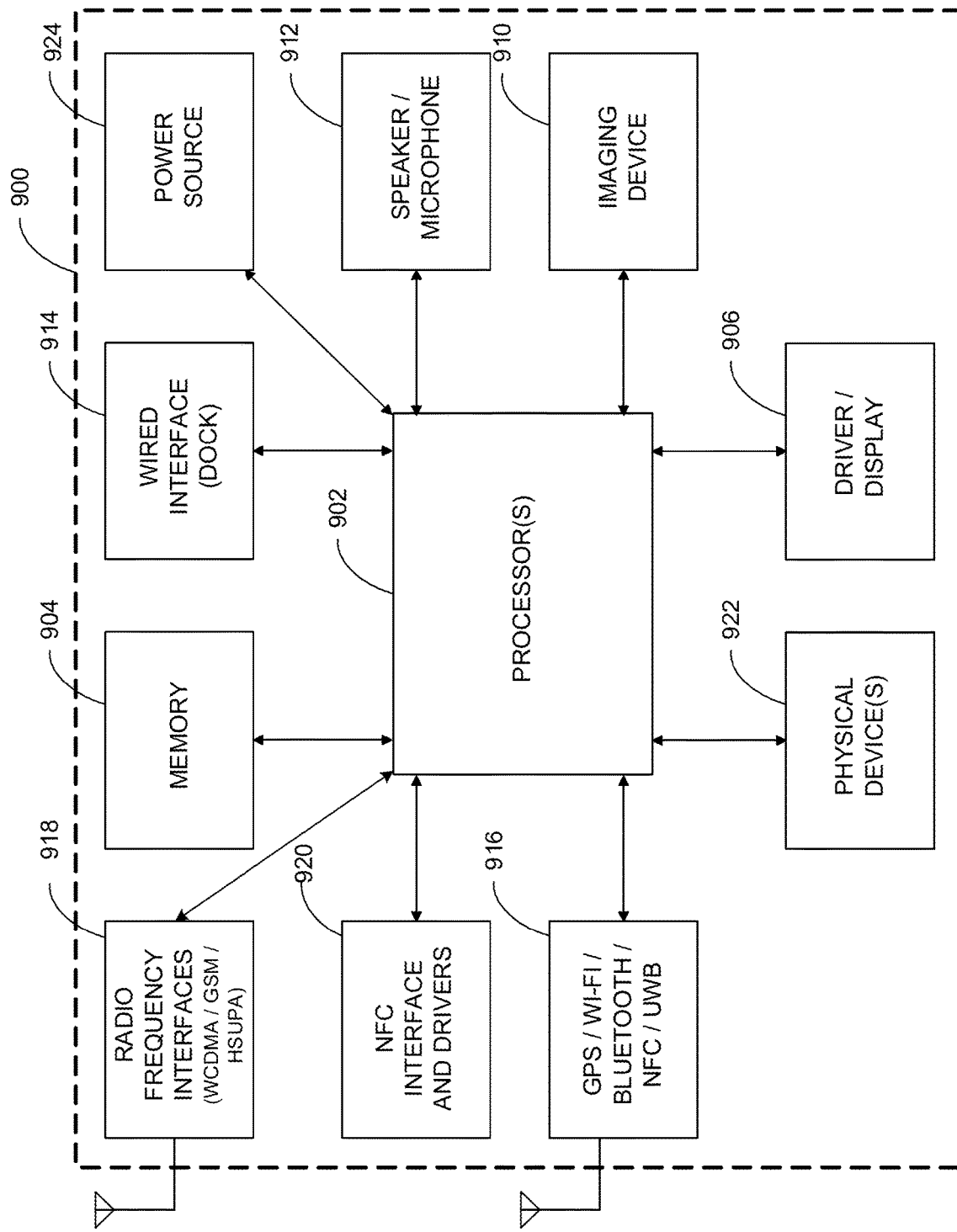
FIG. 9 is a block diagram illustrating an example of a computer system capable of implementing various processes in some embodiments.

FIG. 9 illustrates a functional block diagram of various embodiments of the present invention. More specifically, it is contemplated that from NFC reader devices, smart devices to cloud-based servers may be implemented with a subset or superset of the below illustrated components. In FIG. 9, a computing device 900 may include some, but not necessarily all of the following components: an applications processor 902, memory 904, a display 906, an image acquisition device 910, audio input/output devices 912, and the like. Additional communications from and to computing device 900 can be provided by via a wired interface 914 (e.g. dock, plug, controller interface to peripheral devices); a GPS/Wi-Fi/Bluetooth interface/UWB 916; an NFC interface (e.g. antenna or coil) and driver 918; RF interfaces and drivers 920, and the like. Also included in some embodiments are physical sensors 922 (e.g. (MEMS-based) accelerometers, gyros, magnetometers, pressure sensors, temperature sensors, bioimaging sensors etc.).

In various embodiments, computing device 900 may be a computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Oculus Rift, HTC Vive, Sony PlaystationVR, Magic Leap, Microsoft HoloLens); a wearable device (e.g. Motiv smart ring, smart headphones); an implanted device (e.g. smart device medical), an NFC reader device, described above, a server or the like. Typically, computing device 900 may include one or more processors 902. Such processors 902 may also be termed application processors, and may include a processor core, a video/graphics core, and other cores. Processors 902 may include processor from Apple (A12, A13), NVidia (Tegra), Intel (Core), Qualcomm (Snapdragon), Samsung (Exynos), ARM (Cortex), MIPS technology, a microcontroller, and the like. In some embodiments, processing accelerators may also be included, e.g. an AI accelerator, Google (Tensor processing unit), a GPU, or the like. It is contemplated that other existing and/or later-developed processors/microcontrollers may be used in various embodiments of the present invention.

In various embodiments, memory 904 may include different types of memory (including memory controllers), such as flash memory (e.g. NOR, NAND), SRAM, DDR SDRAM, or the like. Memory 904 may be fixed within computing device 900 and may include removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data, databases or the like. Additionally, in some embodiments, a secure device including secure memory and/or a secure processor are provided. It is contemplated that other existing and/or later-developed memory and memory technology may be used in various embodiments of the present invention.

In various embodiments, display 906 may be based upon a variety of later-developed or current display technology, including LED or OLED status lights; touch screen technology (e.g. resistive displays, capacitive displays, optical sensor displays, electromagnetic resonance, or the like); and the like. Additionally, display 906 may include single touch or multiple-touch sensing capability. Any later-developed or conventional output display technology may be used for embodiments of the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 906 may integrated into computing device 900 or may be separate. 100821 in some embodiments of the present invention, acquisition device 910 may include one or more sensors, drivers, lenses and the like. The sensors may be visible light, infrared, and/or UV sensitive sensors that are based upon any later-developed or convention sensor technology, such as CMOS, CCD, or the like. In some embodiments of the present invention, image recognition algorithms, image processing algorithms or other software programs for operation upon processor 902, to process the image data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In various embodiments of the present invention, imaging device 910 may provide user input data in the form of a selfie, biometric data, or the like.

In various embodiments, audio input/output 912 may include conventional microphone(s)/speakers. In various embodiments, voice processing and/or recognition software may be provided to applications processor 902 to enable the user to operate computing device 900 by stating voice commands. In various embodiments of the present invention, audio input 912 may provide user input data in the form of a spoken word or phrase, or the like, as described above. In some embodiments, audio input/output 912 may be integrated into computing device 900 or may be separate.

In various embodiments, wired interface 914 may be used to provide data or instruction transfers between computing device 900 and an external source, such as a computer, a remote server, a POS server, a local security server, a storage network, another computing device 900, a client device, a peripheral device to control, or the like. Embodiments may include any later-developed or conventional physical interface/protocol, such as: USB, micro USB, mini USB, USB-C, Firewire, Apple Lightning connector, Ethernet, POTS, custom dock, or the like. In some embodiments, wired interface 914 may also provide electrical power, or the like to power source 924, or the like. In other embodiments interface 914 may utilize close physical contact of device 900 to a dock for transfer of data, magnetic power, heat energy, light energy, laser energy or the like. Additionally, software that enables communications over such networks is typically provided.

In various embodiments, a wireless interface 916 may also be provided to provide wireless data transfers between computing device 900 and external sources, such as computers, storage networks, headphones, microphones, cameras, or the like. As illustrated in FIG. 9, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like. As described above, data transmissions between computing device 900 and a smart device may occur via UWB, Bluetooth, ZigBee, Wi-Fi, a mesh network, NFC or the like.

GPS receiving capability may also be included in various embodiments of the present invention. As illustrated in FIG. 9, GPS functionality is included as part of wireless interface 916 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces in various embodiments. In various embodiments, RF interfaces 918 may support any future-developed or conventional radio frequency communications protocol, such as CDMA-based protocols (e.g. WCDMA), GSM-based protocols, HSUPA-based protocols, G4, G5, or the like. In some embodiments, various functionality is provided upon a single IC package, for example the Marvel PXA330 processor, and the like. As discussed herein, an NFC antenna and circuits 920 are provided to send EMF signals to and receive EMF signals from a smart device close to the NFC antenna.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 906 and inputs/or outputs to physical sensors 922 may be processed in parallel processing threads. In other embodiments, such events or outputs may be processed serially, or the like. Inputs and outputs from other functional blocks may also be processed in parallel or serially, in other embodiments of the present invention, such as acquisition device 910 and physical sensors 922.

In some embodiments of the present invention, physical sensors 922 (e.g. MEMS-based) accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like may be provided. The data from such sensors may be used to capture data associated with device 900, and a user of device 900. Such data may include physical motion data, pressure data, orientation data, or the like. Data captured by sensors 922 may be processed by software running upon processor 902 to determine characteristics of the user, e.g. gait, gesture performance data, or the like. In some embodiments, sensors 922 may also include physical output data, e.g. vibrations, pressures, and the like.

In some embodiments, a power supply 924 may be implemented with a battery (e.g. LiPo), ultracapacitor, or the like, that provides operating electrical power to device 900. In various embodiments, any number of power generation techniques may be utilized to supplement or even replace power supply 924, such as solar power, liquid metal power generation, thermoelectric engines, rf harvesting (e.g. NFC) or the like.

FIG. 9 is representative of components possible for a smart reader, a smart device, an authentication server capable, and the like for embodying the present invention. It will be readily apparent to one of ordinary skill in the art that many other hardware and software configurations are suitable for use with the present invention. Embodiments of the present invention may include at least some but need not include all of the functional blocks illustrated in FIG. 9. For example, a smart phone (e.g. access control device) configured to perform may of the functions described above includes most if not all of the illustrated functionality. As another example, a wearable device, e.g. a smart ring (electronic devices enclosed in a ring-shaped shell, enclosure, or form factor), may include some of the functional blocks in FIG. 9, but it need not include a high-resolution display 930 or a touch screen, a speaker/microphone 960, wired interfaces 970, or the like. In still other examples, a cloud-based server or a virtual machine (VM) may not include image acquisition device 912, MEMs devices 922, GPS capability 916, and the like, further components described above may be distributed among multiple computers, virtual machines, or the like. Additionally, embodiments of smart NFC reader may not need GPS capability 916, MEMS devices 922, imaging devices 910, or the like.

Figure 12:
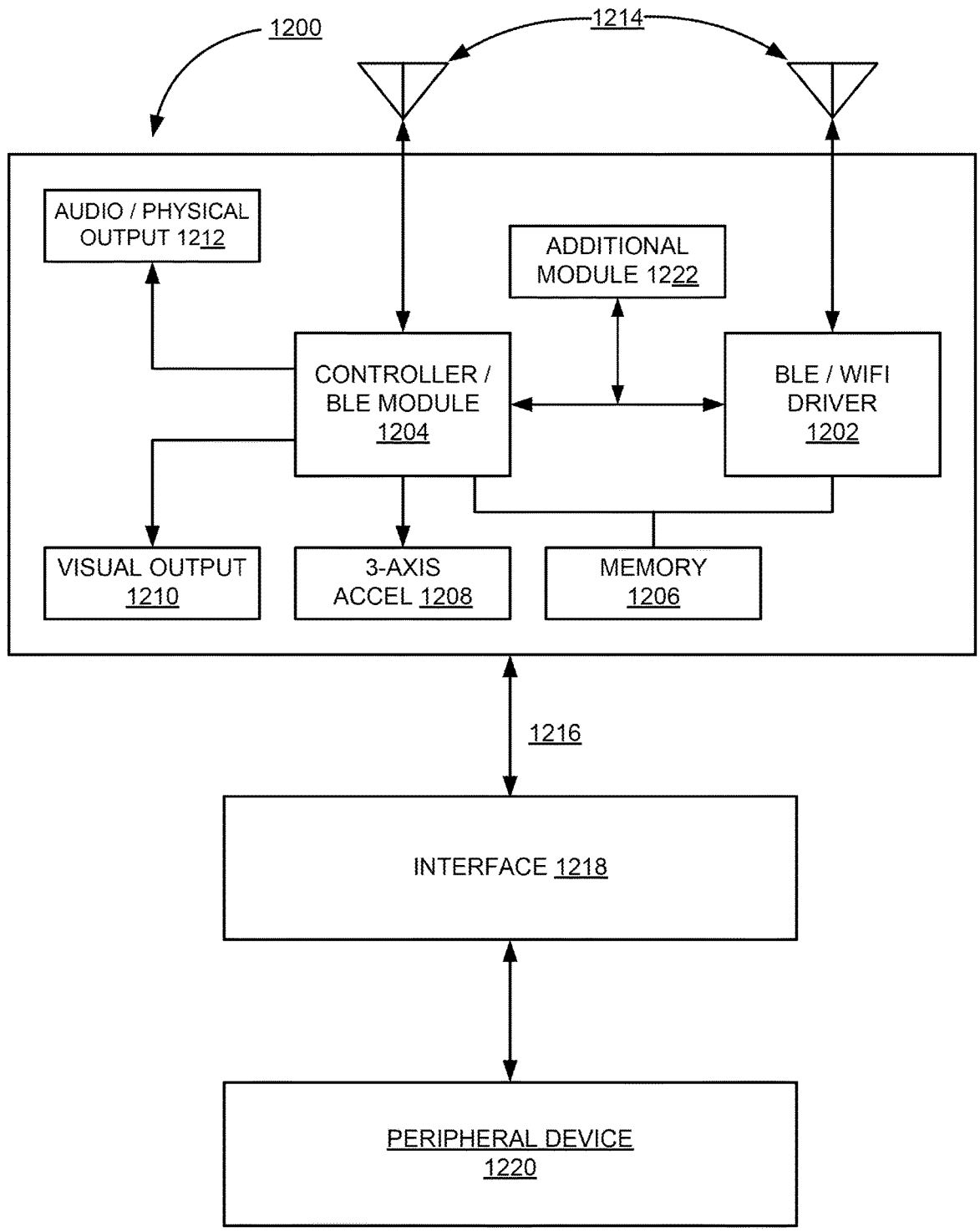
FIG. 12 is another block diagram of a reader according to various embodiments of the present invention.

FIG. 12 illustrates a block diagram according to some embodiments of the present invention. More specifically, FIG. 12 illustrates a block diagram of a short-range reader device 1200 that may be included within an NFC smart reader device. Alternatively, reader device 1200 may be coupled to an existing NFC reader device to provide the short-range transmissions discussed herein and illustrated in FIG. 1A. In some embodiments, device 1200 may include some or all of the following components: an rf control module 1202, a controller 1204, memory 1206, an accelerometer 1208, visual/haptic output 1210, audio output 1212, antennas 1214, interface bus 1216, and an interface module 1218.

In operation, reader device 1200 may perform the short-range communications of module 916 with smart devices, as illustrated in FIG. 9 (e.g. BLE, UWB, etc.). Device 1200 may also perform the functions illustrated and discussed in FIG. 10, such as receiving a token from an authentication service and determining if the user is authorized to interact with the NFC smart reader.

In some embodiments, controller 1204 may be embodied as a Nordic nRF52832 system on a chip, suitable for controlling Bluetooth low energy (BLE) communications and UWB communications, and for performing various functionalities described herein. Controller 1204 may include a processor, such as a 42-bit ARM® Cortex®-M4F CPU and include 1212 kB to 124 kB RAM. In various embodiments, other types of SoC controllers may also be used, such as Blue Gecko from Silicon Labs, CC2508 from TI, or the like. Controller 1202 may be embodied as a muRata 1LD Wi-Fi/BLE module, suitable for controlling Bluetooth low energy (BLE), Wi-Fi communications. Controller 1202 may include a processor, such as a 42-bit ARM Cortex®-M4. In various embodiments, other types of controllers may also be used, such as CYW43012 from Cypress, or the like. In some embodiments, modules 1202 and 1204 enable communication via short range communications protocols, such as BLE, ZigBee, UWB, Wi-Fi or the like. Modules 1202 and 1204 may also support mesh networking via BLE, Wi-Fi 12, or the like. In some embodiments, module 1202 also supports Wi-Fi communications to communicate over a wide-area network (e.g. Internet).

In various embodiments, memory 1206 may include non-volatile memory storing embodiments of the executable software code described herein. In some embodiments, the memory may be SRAM, Flash memory, or the like. In FIG. 12, audio/haptic output 1212 is provided to give a user with audio feedback or haptic feedback and visual output 1210 is provided to give a user visual feedback in response to the user approaching reader device 1200. In some embodiments, visual output 1210 may be one or more LED lights having different colored outputs, may be a status display panel. The feedback may be provided to the user based upon an application running upon the smart device and interacting with reader device 1200.

Accelerometer 1228 is provided in some embodiments to determine whether reader device 1200 is tampered with. For example, after installed and operable on a mounting location (e.g. on a wall), accelerometer 1228 monitors the orientation of accelerometer 1228 with respect to gravity. If a party attempts to remove reader device 1200 from a mounting surface, accelerometer 1228 will be able to sense the change in orientation. Based upon the change in orientation exceeding a threshold, a number of actions may be taken by reader device 1200. One action may be to cease operation of reader device 1200, another action may be to alert a remote server of the tampering, and the like. In other embodiments, other physical sensors, e.g. pressure sensors, light sensors, gyroscopes, and the like may be used. Such embodiments may also provide tamper detection indication.

In FIG. 12, interface 1216 is used to couple reader device 1200 to interface module 1218. In various embodiments, interface module 1218 interfaces with any number of external functional modules, e.g. NFC reader device, a transaction system, a POS system, a kiosk, or the like. In one configuration, an external functional module 1220 may include a peripheral device under NFC control, e.g. automatic door (e.g. a ADA-compliant automatic door), a television, a vending machine, a computer, an electronic panel, an automobile, a kiosk or the like; in another configuration, external functional module 1220 may be an existing module that is configured to read conventional low frequency or high frequency (LF/HF/UHF/NFC etc.) based proximity cards or badges; and the like. In some embodiments, external reader module 1220 may be an existing reader mounted upon a wall, next to a transaction system, next to a POS system or the like. In some embodiments, interface 1216 may provide power to reader module 1200, interface 1216 may transmit data from reader device 1200 to interface module 1218 (e.g. credentials), provide power or the like.

In one configuration, rf control module 1202 is not used, and only one antenna 1214 is provided, or vice versa; in another configuration, modules 1202 and 1204 are both used, and two antennas 1214 are used (one specifically for scanning for ephemeral IDs within a geographic region and one specifically for handling communications with a smart device). Such embodiments are particularly useful in high volume situations wherein one antenna may receive ephemeral IDs from many different smart devices (e.g. five users walking down a hall near a security door or vending machine), whereas the other antenna will provide the credentials and receive tokens from the specific users' smart devices who want to interact with the reader (e.g. to enter the security door, to receive a good, to access a computer, receive power or the like). In other embodiments, other channels may be used to provide the above communications, such as short-range Wi-Fi, Zigbee, NFC, ANT, UWB or the like.

In still another configuration, additional modules 1222 may be provided to add additional functionality to reader module 1200. In some embodiments, module 1222 may be an rf encoding module that converts data associated with the user (e.g. a badge number) into a format (e.g. LF/HF/UHF/NFC badge or tag) that is readable by a conventional RFID card or badge reader. In some embodiments, module 1222 may include one or biometric capture devices that capture biometric data of a user associated with a smart device, or that couple to biometric capture devices. In some embodiments, biometric data may include facial data, voice data, eye data (e.g. iris, retina, blood vessel), print data (e.g. fingerprints, palm print, blood vessel), movement data (e.g. signature, movement, gait), OAE profile, heartbeat data, and the like that may be used to facilitate authentication of the user.

In one embodiment systems and methods are provided for universal presence detection and interactions. As a non-limiting example, the universal ID signal is created that represents clients, people or other objects hereafter "first party" where any system, sensor or software can detect that signal and queries it for relevant information for serving the person or object. As a non-limiting example this entails a method of turning mobile devices, wearables or biochips and the like hereafter "device" into a personal transponder (e.g. transceiver) that emits a unique signal via Bluetooth low energy as in one instance to represent the presence of the person, e.g., user. Things around the user can detect the signal and can transform the signal into a meaningful metadata that represents the person or object of the signal.

In one embodiment systems and methods are provided for instant execution of actions through wireless connections. As a non-limiting example this incorporates a peripheral and central mode of operation is used to obtain a token. The token is only executed when it is within a threshold to make for an instant action. By scanning the address or other identifier of the device, and keeping a token cached locally in the embedded system, the embedded system can then act instantly on any command/intent that the mobile client triggers such that there is no lag between the intent and the performed action.

In one embodiment systems and methods are provided for sensing the presence of identifiable objects. As a non-limiting sensor technology is used that scans and primes objects nearby which emits a unique universal ID signal. As a non-limiting example, the sensor can trigger an emitter to provide specific information about it or the emitter of the presence universal ID signal can detect the scanner and do the same. In this embodiment systems and methods are provided of turning a sensor into both a peripheral and central device for the purposes of detecting the presence of objects nearby. This can be used to securely make the handshake and reduce the load on the first party by using the scanner on the sensor to do most of the hard work to not overload the peripheral modes.

In another embodiment systems and methods are provided for passive detection and identification of passengers, first party, on a moving vehicle. As a non-limiting example this can include use of an accelerometer and a signaling protocol to conclude that the object being sensed is in fact travelling with the vehicle that the sensor is attached to. Steps are taken with the universal ID signal and shares commands between the sensor the passenger to trigger a confirmation that the passenger is travelling on the vehicle. The main use case is to sense when people are travelling on a bus or train and to be able to do things such as process payments for the traveler automatically or to track the passenger's route.

In another embodiment systems and methods are provided to secure offline interactions. As a non-limiting example, a method is provided for collecting a plurality of commands on the first party and a bloom filter is used on the sensor side to certify a secure command through BLE (Bluetooth low energy) has happened without any fall back over the internet. As a non-limiting example this method can be used to issue any type of command, including but not limited to payments, metadata, and the like, between things and a sensor with limited storage capacity within proximity without the need for an internet connection.

In another embodiment systems and methods are provided for secure physical payment processing over wireless local networks. As a non-limiting example, a method of handshaking the connection to a POS/terminal and the first party's mobile device is used where both sides are securely verified. Once an amount is entered in a terminal and applied to the detected entity the payment is batched and processed on the back end. In this manner there is no exchange of payment information between the terminal and the first party for a safer and secure payment process. In this embodiment the system defines that things are done in a unique way for anything which as non-limiting examples can be Google Hand's Free, Apple Pay and the like.

In one embodiment systems and methods are provided for wireless identification for connecting second party account services access via a proxy agent. Non-limiting examples the system and method allow devices to detect the first party and access first party accounts including but not limited to: Andorra, Netflix, one or more Calendars, an Amazon Account, and the like, through a proxy agent. As a non-limiting use case is the ability to walk up to any Echo like device and it instantly recognizes and can say "Hello first party X" and first party X can say to it "play my easy music station on Pandora", having never used the device before or having to set up first party X's specific account with the Echo device. This is an improvement over the need to set up an account and limit these devices to just the users with accounts set to them. Another use case is the ability to use any TV Screen and X's avatar shows. As non-limiting examples as first party X taps it all of its' Netflix shows, YouTube videos, and the like, show up for first party X and to instantly play it. As first party X walks away it all disappears. All of this exposes an oath to the Netflix account of first party X to the TV software to start playing it without forcing first party X to do another separated Netflix login on the TV.

In another embodiment systems and methods are provided for wireless identification of fixed and roaming objects. As a non-limiting example objects are discovered wirelessly. As non-limiting examples this can be achieved by using this to cover the use case of being able to create a wireless (barcode like identifier) that every device can emit to be identified, including but not limited to, the VIN of a car, a serial number of a customer electronic, and the like. This identification can then be used for situations such as auto paying for parking meters and parking and getting access to buildings, and the like. As another non-limiting example this can be used for turning people into beacons. In this manner each individual object then has its own identity beacon.

In another embodiment systems and methods are used for bi-directional communicating beacons. As a non-limiting example this can be one of a bi-directional beacon that can not only emit an advertising packet but can also scan for advertisements to query things around it for useful information or metadata that can be used to serve the subject. The limitation of beacons is that they all require a corresponding app that listening for the specific beacon to be of any use. By creating a bi-directional beacon, it can serve people that have the apps. It can also serve people who do not have the apps but detects their presence signature to serve them. This provides a self-contained beacon device similar to current beacons, that operates in both peripheral and central modes for the bi-direction natures of detection and communications.

In another embodiment systems and methods are provided for a wireless digital driver's license and verified identification. As a non-limiting example, this creates an electronic driver's license that emits as a wireless signal. Police authorities and the like can detect and instantly query the license by standing next to the first party. The first party never needs to carry a license anymore or present any info and their privacy is intact with the use of a universal ID signal. As non-limiting examples this provides how the first party enters its information into its account, how identification is verified through several methods, as well as how an associated universal ID signal provides for security to make the universal ID signal securely available to authorities through their own mobile devices.

In another embodiment systems and methods are provided for automatically paying fares on public transport. As a non-limiting example provides for, (i) automatically detecting passengers who are on a public transport vehicle, (ii) detects when they get on and off and (iii) processes payment for the fare automatically for them on the back end without the user having to do anything.

Figure 13:
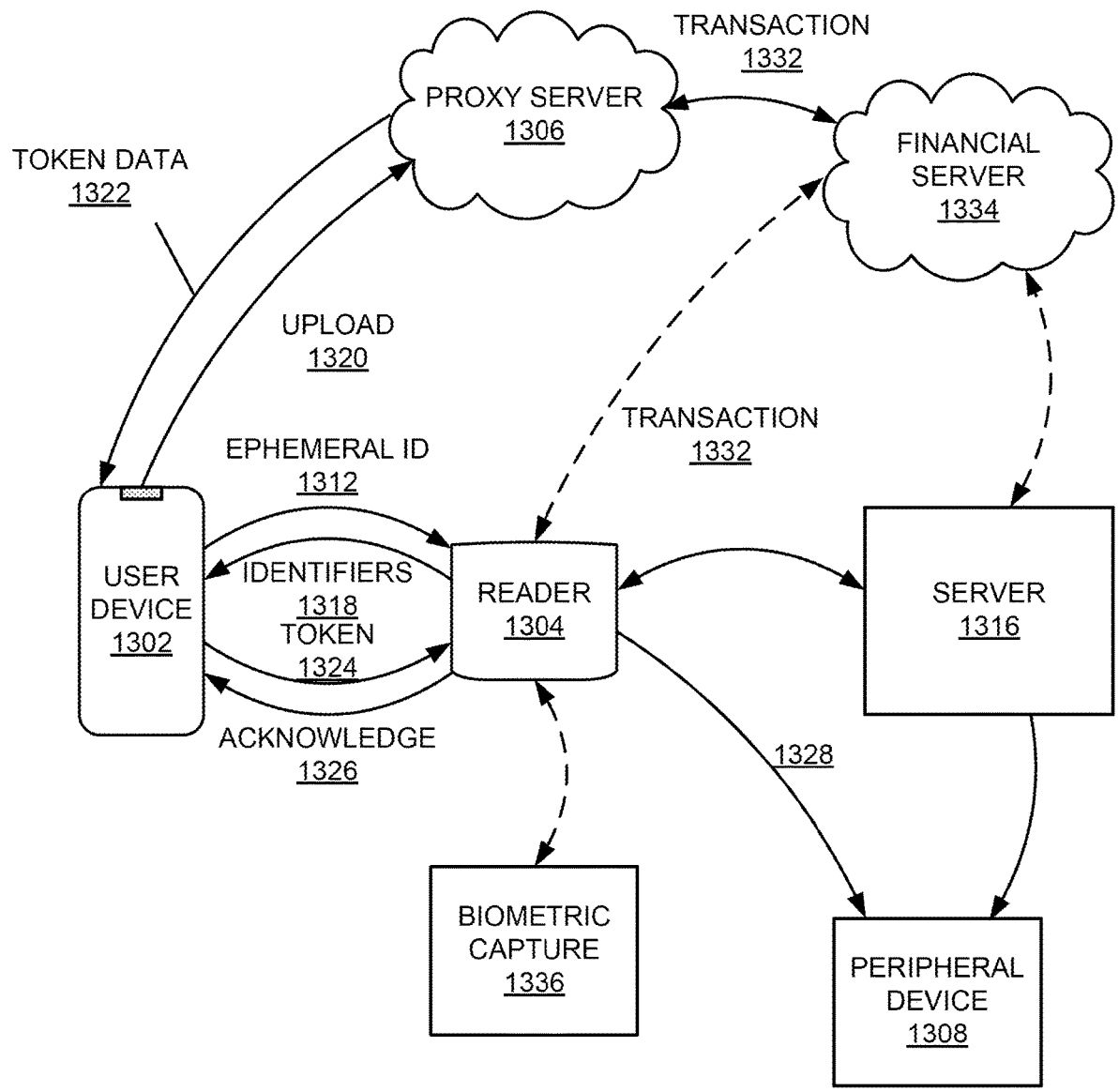
FIG. 13 is another block diagram of a system according to various embodiments of the present invention.

In FIG. 13 systems are illustrated including a first user device (e.g. a smart phone, smart watch, ring, tablet, wearable device, augmented reality glasses) 1302 coupled to a reader 1304 and to a cloud-based server 1306. Reader device 1304 may also be coupled to a peripheral device 1308 and financial server 1334. In some embodiments, peripheral device 1308 may be a laptop computer, a point of sale (POS) system, a transportation-related device, a ticket machine, a security door or gate, a control panel, a locker (e.g. Amazon), and the like. In FIG. 13, a peripheral access control system (PACS) 1316 may be provided in some embodiments to control peripheral device 1308. In some embodiments, server 1316 may also be coupled to financial server 1334.

In some specific embodiments, reader device 1304 may be embodied in a transit terminal that controls user access to a transit system (e.g. peripheral device 1308), e.g. security door or gate, computer, control panel, or other device described herein. In another embodiment, reader device 1304 may be coupled to a point of sale (POS) system (e.g. peripheral device 1308).

In some embodiments, reader device 1304 performs several functions when interacting with user devices (e.g. device 1302) including: broadcasting a beacon, scanning for nearby user devices (detecting ephemeral IDs or identifiers); connecting to (and optionally pairing) with devices for secure transfer of data; providing reader identifiers, receiving payload data from devices; and optionally interacting with financial server 1334.

FIGS. 14A-F illustrates a block diagram of a process according to some embodiments of the present invention. To better visualize the interaction between components of embodiments of the present invention, these steps are illustrated with respect to a system block diagram similar to that illustrated in FIG. 13.

Figure 14A:
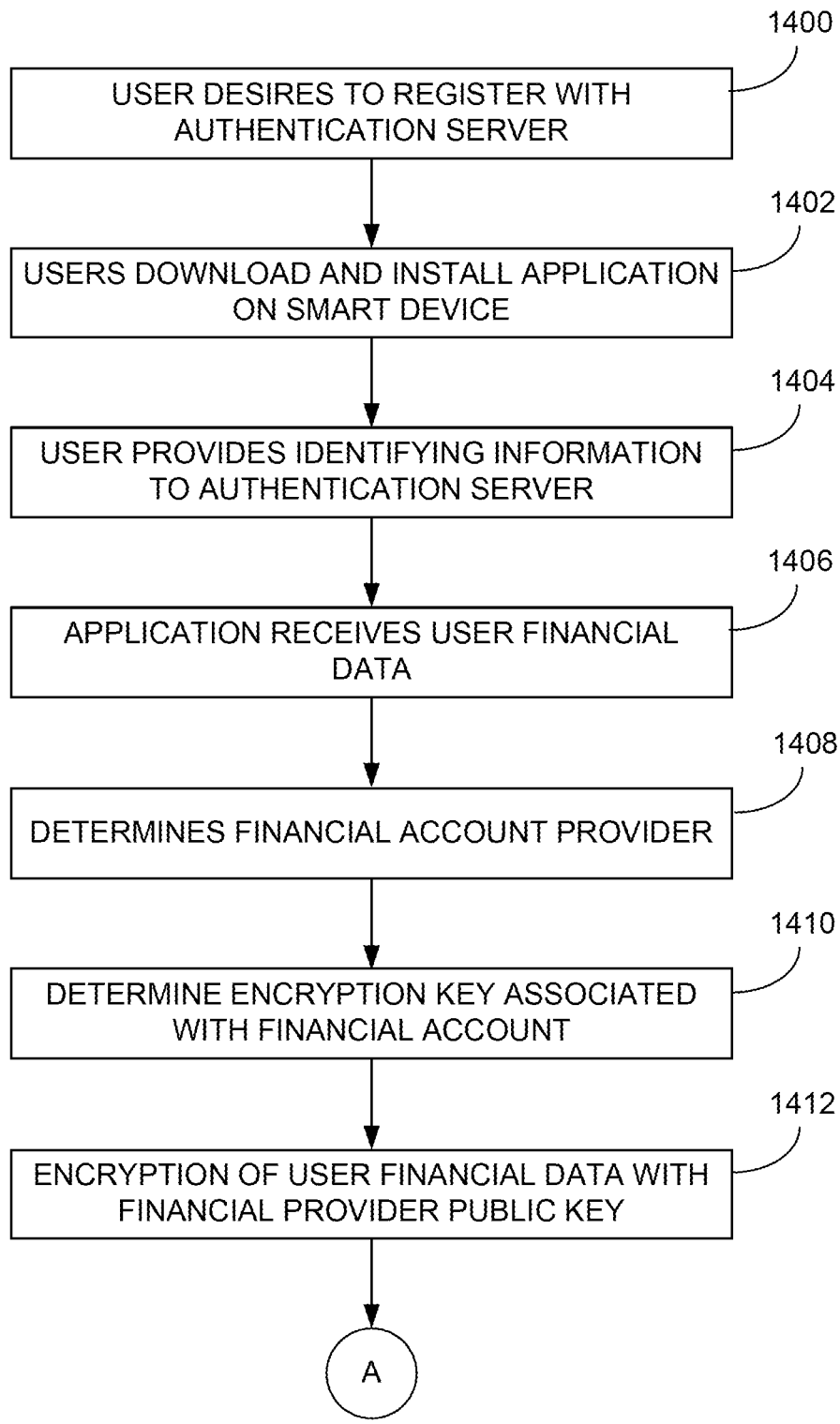
FIGS. 14A-F are flow diagrams of various processes according to some embodiments.
Figure 14B:
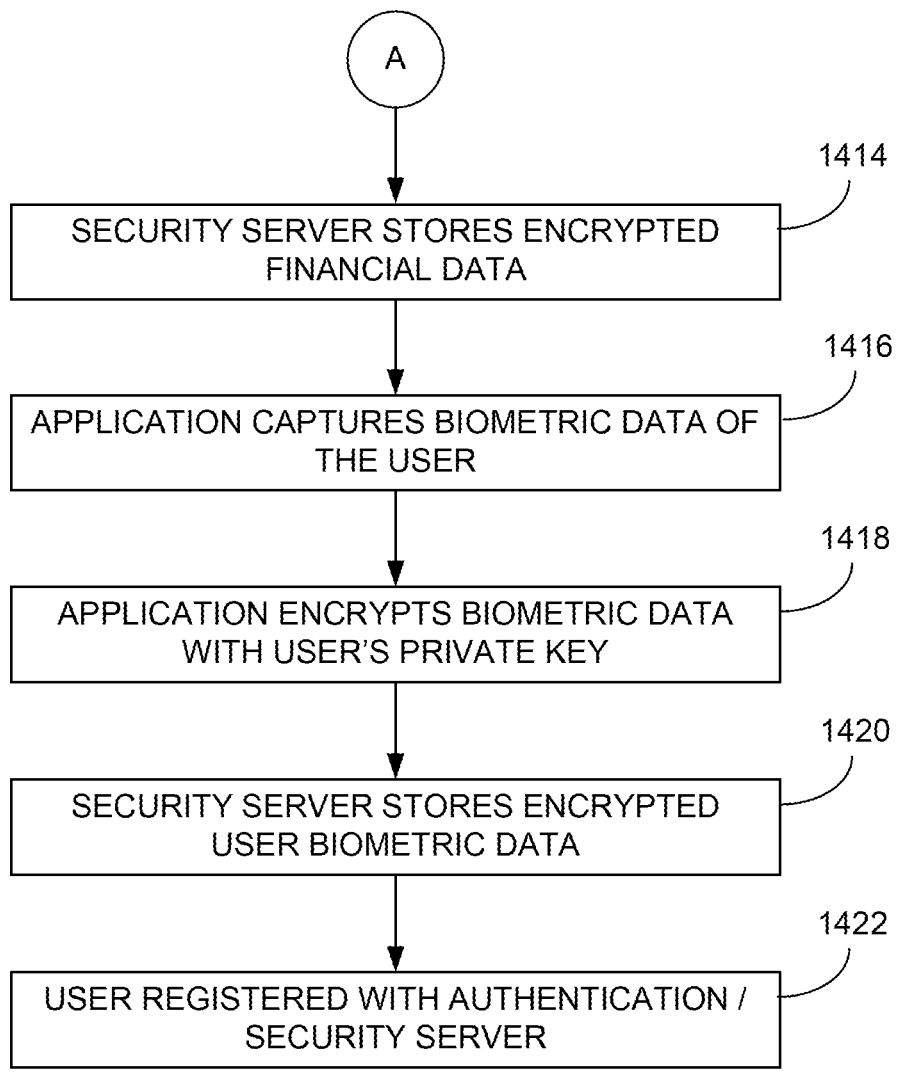

In FIGS. 14A-B, in some embodiments, users desire to obtain services from security server 1306, step 1400 and download and install a security application on their smart-device 1302, step 1402. The application may be downloaded from an application store such as the AppStore, Google Play, and the like. In some embodiments, the security application may be an application developed by the assignee of the present patent application. Next, using the security application running upon the smart device, the users provide identifying information such as their e-mail address, phone number, or the like to authentication server 1306 via a wide-area network to register device 1302 with the cloud-based security server 1306, step 1404.

In some embodiments, the user may provide financial account data or payment data to the application on the smart device, step 1406. In some examples, the financial account data maybe a credit card, a bank account number, a debit card, a third-party payment system, e.g. PayPal token, a Clipper card, or the like. In various embodiments, the application may determine a provider associated with the financial account, step 1408 and a public encryption key associated with the financial account data, step 1410. It is contemplated that such financial account providers facilitate secure communications across wireless communication devices by supporting such public/private key functionally.

In some embodiments, in response, the financial account data may be encrypted with the financial provider's public key, step 1412. In some examples, the user smart device may perform steps 1408 and 1410, and in other examples, security server 1306 may perform these steps. In various embodiments, the application may then securely upload the encrypted data to security server 1306 for storage in association with the user identifying information, step 1414.

In some embodiments, the application may acquire biometric data associated with the user, step 1416. For example, the user's smart device may capture an image of the user's face, a fingerprint, a voice print, performance data (e.g. movement data, gait data, gesture data, signature data, or the like. This biometric data may optionally be hashed before being encrypted with a private key of the user, step 1418. In various embodiments, the application may then securely upload the encrypted biometric data to security server 1306 for storage in association with the user identifying information, step 1420.

As a result of these steps, the users and the users' smart phones are personally identified to security server 1306 along with encrypted financial information and optionally encrypted biometric data, step 1422.

In various embodiments, reader devices 1304 may be installed on transportation related systems (peripheral device 1308), e.g. mass transit systems, busses, trains, airports, taxis, ride-sharing systems (e.g. automobiles, bicycles, scooters, etc.), ports, or the like. In other embodiments, reader devices 1304 may be installed next to point of sale (POS) systems (peripheral device 1308), or the like.

In various embodiments, reader 1304 is typically registered with security server 1306 via use of a reader identifier, or the like. Additionally, reader device 1304 may also be registered with financial server 1334, in some specific cases of a transit-related embodiment. For example, reader device 1304 may be associated with a particular geographic transit station, a particular vehicle, and the like.

Figure 14C:
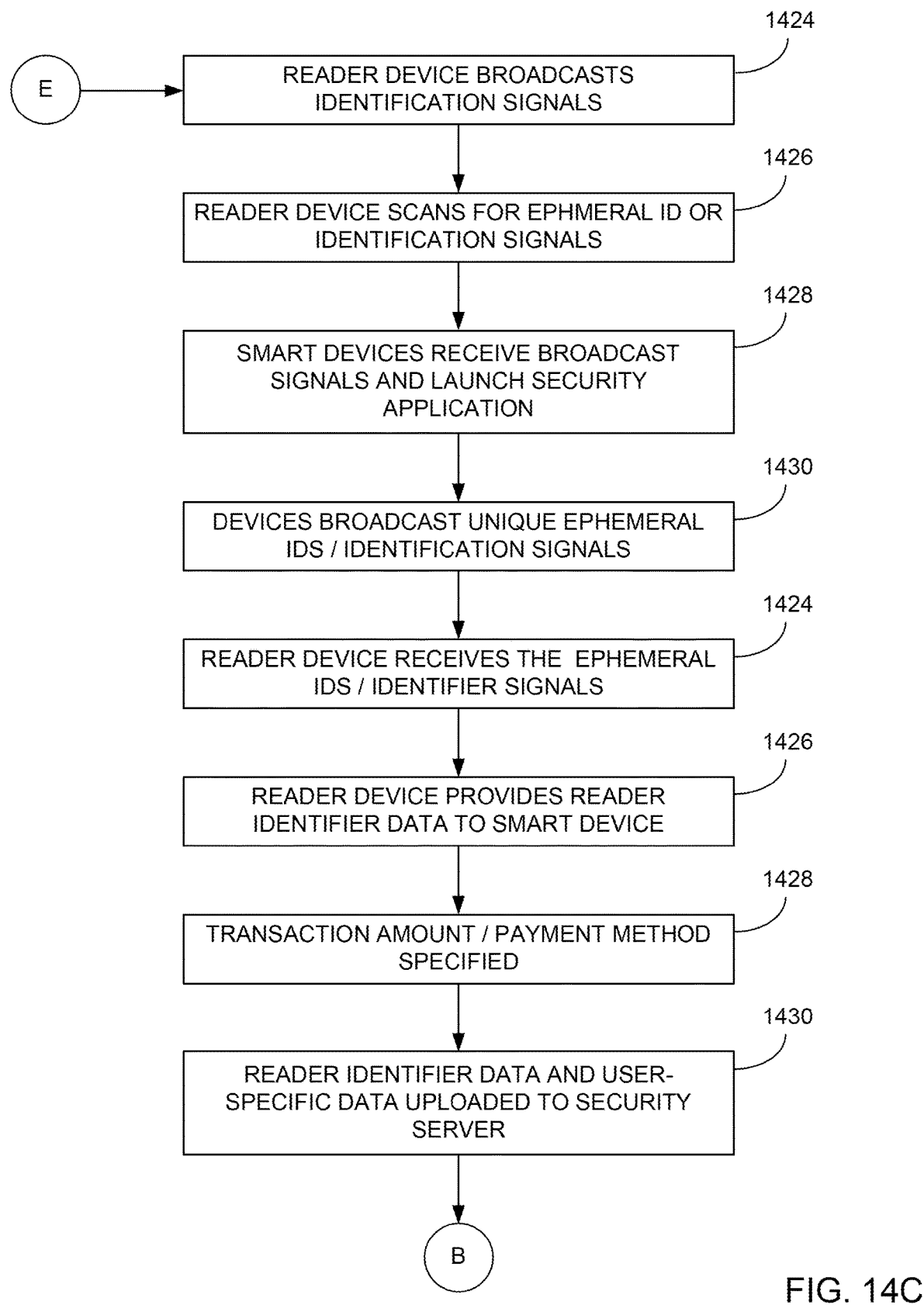
Figure 14D:
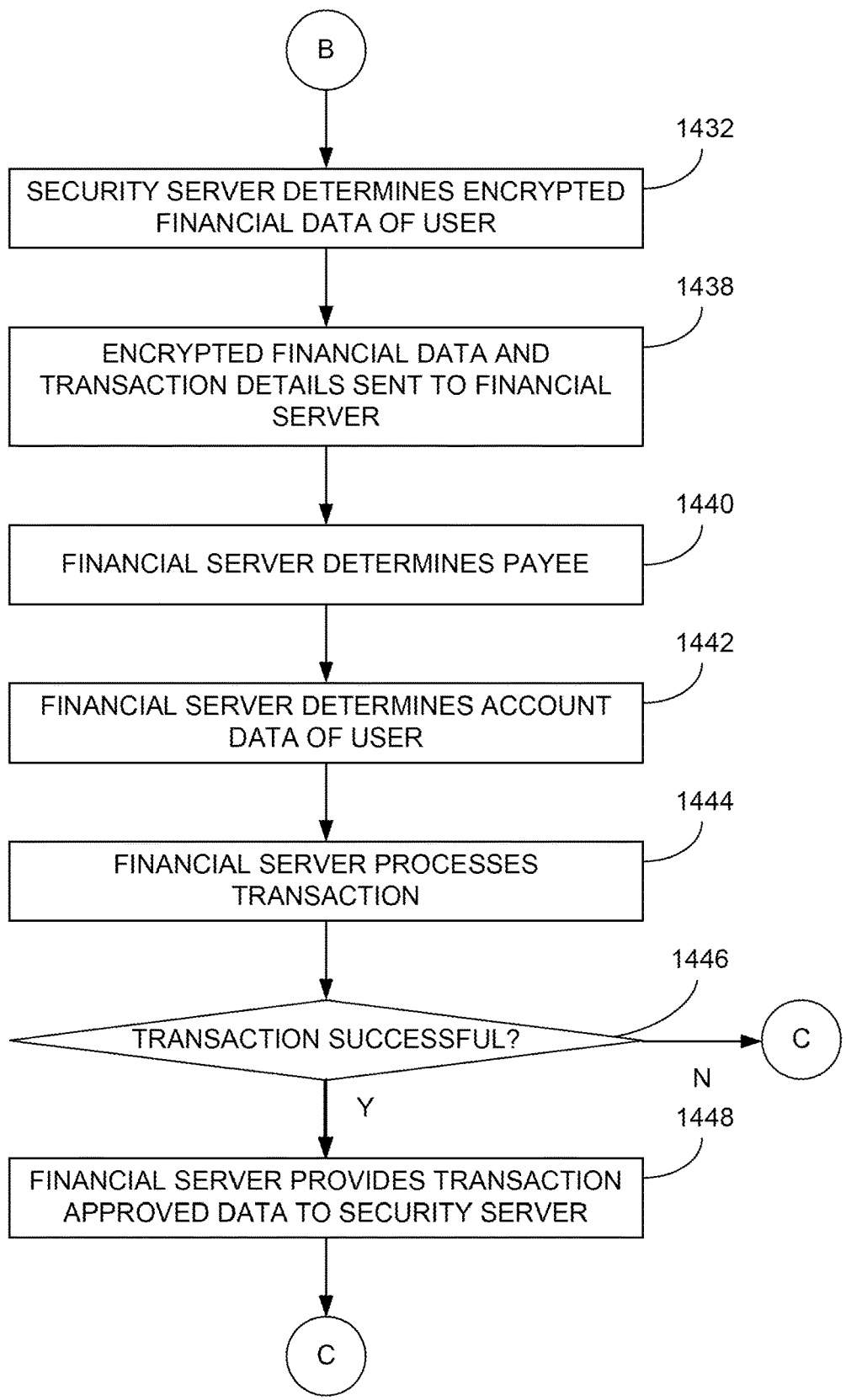
Figure 14E:
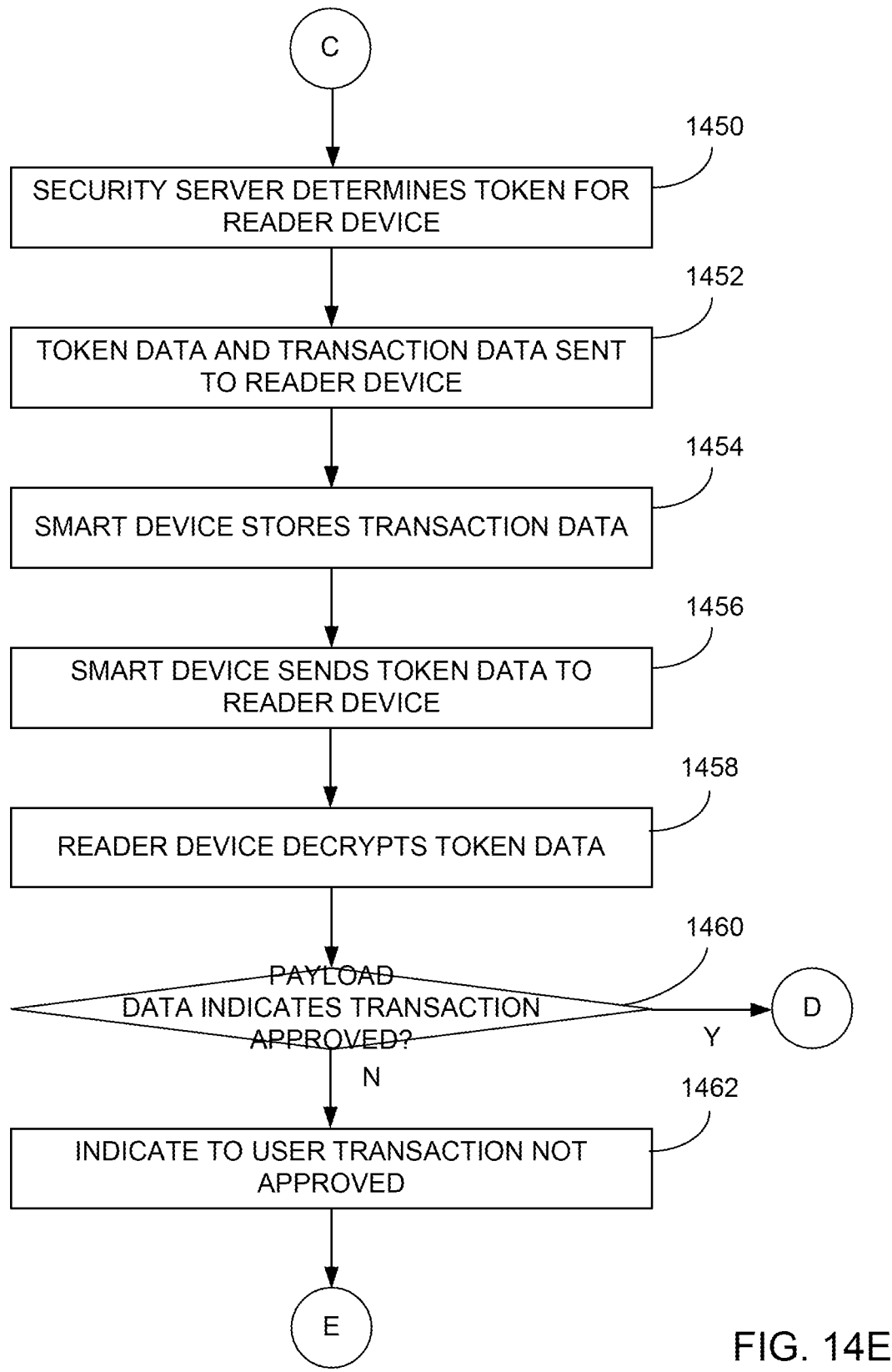
Figure 14F:
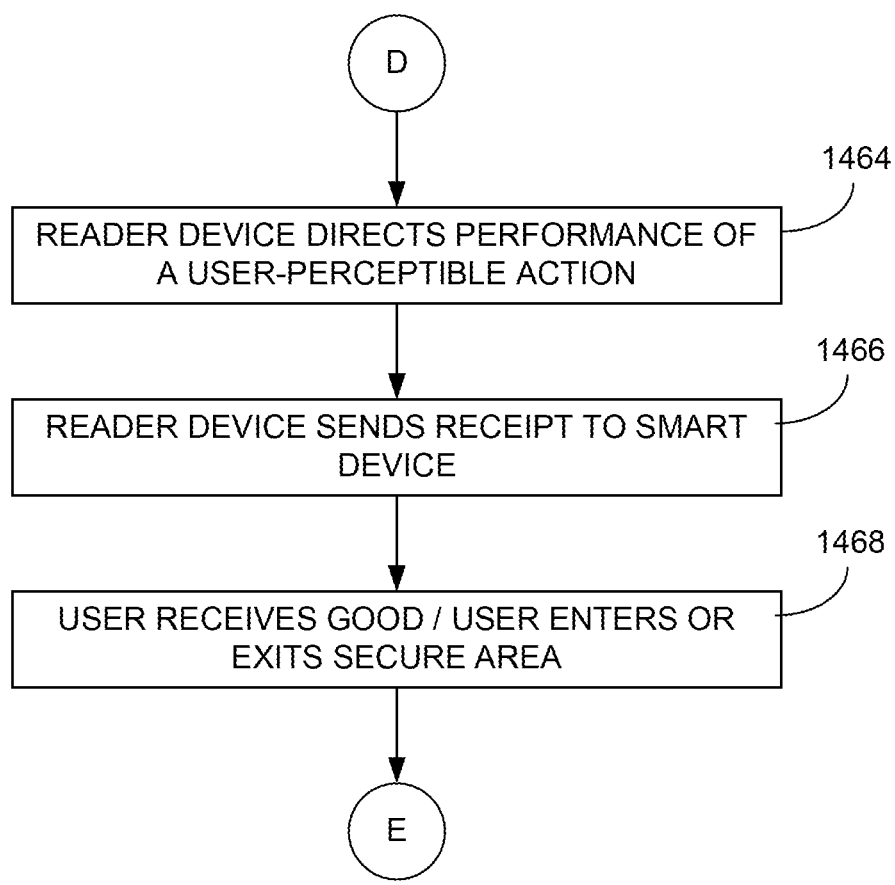

In FIG. 14C, initially reader device (e.g. 1304) broadcasts signals using one of its short-range radios (e.g. a first radio—BLE), step 1424. Additionally, reader devices enter a scanning mode using one of its short-range radios (e.g. BLE, UWB) to monitor for ephemeral ID or identifier signals from smart devices, etc., step 1426. In some embodiments, the radio used may be the same radio used in step 1424 or may be another radio. As examples, a first radio may be used for both steps 1424 and 1426 by alternating in time between broadcast and scan modes, or a first radio may be used for step 1424 and a second radio may be used for step 1426.

Next, in some embodiments, user devices, e.g. 1302 may receive the broadcast signals from reader device 1304 and the security application discussed in step 1402 may be launched, if the security application is not already running on the smart devices (or in the background or registered with the operating system), step 1428. In some embodiments, the security application may be an application developed by the assignee of the present patent application. In some examples, the operating system may automatically launch the security application or portions of the application, in other examples, the user manually runs the security application, or the like. In other examples, a user may be required to enter a password, provide biometric data, or the like to facilitate some of the operations described herein.

In some embodiments, responsive to the broadcast signals from reader device 1304, smart device 1302 provides responsive signals (e.g. ephemeral IDs or identifiers), step 1430. As described above, ephemeral IDs from user devices do not personally identify the users to reader 1304. In various embodiments, the ephemeral IDs may include unique MAC addresses, that may be changed or rotated by the smart devices 1302 over time. In some embodiments, reader 1304 then receives the ephemeral IDs or identifiers, step 1424. This may occur via Bluetooth Low Energy (BLE), ZigBee, UWB, Wi-Fi, or the like.

In various embodiments, in response to the ephemeral ID, reader device may provide identifying information back to smart device 1302, step 1426. Identifying information from reader device 1304 may include a reader identifier, a nonce or other unique data. In some examples it may also include a provider identifier (e.g. transit agency, retailer, rentee, or the like).

In some embodiments, a fare or transaction and/or a payment method may be provided, step 1428. In some examples, the provider's reader device 1304 may provide an amount or fare to user device 1302 and in other cases, the user may enter an amount or fare on their smart device, or authorize the transaction. In still other examples, an amount, fare, or the like may be a set amount, accordingly any transaction may be assumed to be the set amount, accordingly, this step may not be needed. In some examples, the user may specify a specific method for payment, e.g. PayPal, Visa, American Express, or the like. In other cases, a default payment method may be specified or assumed by the service or good provider.

In various embodiments, in response to reader device data, smart device 1302 may upload the reader data along with user-identifiable information 1320 to security server 1306, step 1430. In some embodiments, the uploaded data may include transaction details, including a provided fare or transaction amount, payment provider, etc. may also be uploaded. In various embodiments, these steps may occur via Wi-Fi, cellular, 4G, 5G, or the like.

In various embodiments, security server 1306 determines a financial transaction server associated with the reader identification data, step 1432. As discussed above, in some embodiments, the user may specify a specific transaction processor (e.g. Chase Visa, Discover Card, PayPal, SmartCard, etc.) for processing the transaction, and in other embodiments, a default transaction server may be used (e.g. Clipper card, a debit card, etc.). As discussed in conjunction with FIG. 14A-B, in some embodiments, the user's financial data may be encrypted with the financial server's public key and the encrypted data may be stored in security server. Accordingly, in this step, the encrypted financial data may be identified.

In various embodiments, the security server may send transaction details 1332 including encrypted financial data, an identifier of the provider (e.g. a payee), the amount or fare, and the like to the financial institution server 1334 (e.g. credit card issuer, bank, fare payment service, third-party service (e.g. PayPal)), step 1434. In various embodiments, these steps may occur via Wi-Fi, cellular, 4G, 5G, or the like.

In response, the financial server 1334 may first determine the payee, e.g. the service of goods provider (e.g. transit authority, store, rental car company, or the like), step 1440. Financial server 1334 may then decrypt the encrypted financial data provided by security server 1306 using their (financial server 1334) private key to recover the user's financial data, e.g. account number, credit card account, PayPal authorization token, etc. step 1442. Following these steps, the financial server 1334 may process the transaction, step 1444, on behalf of the provider. In one example, a credit card company (1334) may charge the specified amount against the user's credit card number, in another example, a financial institution may debit an amount against the user's checking or savings account; in another example, a third-party company (e.g. PayPal, Clipper) may record the transaction and then later process the payment via a user-provided payment method (e.g. credit-card); in still another example, a register entry detailing a financial transaction may be provided to a shared, distributed ledger (e.g. blockchain ledger) such as a bitcoin, Ethereum, or the like. In various embodiments, if financial server 1334 is able to record the transaction, step 1446, financial server 1334 provides a transaction receipt, success signal, or the like, back to security server 1306, step 1448.

In various embodiments, in response to the successful transaction receipt, security server 1306 determines a token or other encrypted data packet, step 1450. In various examples, the encrypted token may be encrypted using a private key of security server 1306. It is contemplated that reader device 1304 includes a public key for security server 1306 which can decrypt the token. In various embodiments, security server 1306 then returns token data 1322 back to smart device 1302, step 1452.

In various embodiments, the token may include a payload portion that includes different types of data. In one embodiment, the token may include a transaction receipt provided by transaction server 1334; in one embodiment, the token may include personally identifiable data, such as a user photo, a username, an account number, a badge number, or the like; and the like. In some embodiments, some of the transaction data may be also provided and stored in an unencrypted form to smart device 1302, step 1454. Such unencrypted data may be provided the user with a transaction receipt, or the like.

In the example illustrated, the token data 1324 is then be passed to reader 1304 via short-range communications channels, such as BLE, Zigbee, UWB, or the like, step 1456. Upon receipt, reader device 1304 decrypts the token (typically using the public key of security server 1306), step 1458. In some examples, the token may include data encrypted with a private key of the security server, and the reader devices uses the public key of the security server to recover the token payload data. In some embodiments, the token payload data may include indication that the transaction was approved by the financial data provider, and the like. Next, reader device 1304 determines whether the payload data includes a successful transaction receipt, or the like, step 1460.

In various embodiments, if the transaction is not approved, reader device 1304 may output a user-perceptible action such as a red light, an audio message (e.g. buzz), locking a door or a gate, or the like, step 1462, indicating the transaction the failure.

In embodiments where reader device 1304 determines the transaction is approved, reader device 1304 may direct 1328 peripheral device 1308 to perform a user-perceptible action such as activating a green light, playing an audio message (e.g. ding), unlocking a turnstile, opening gates, deactivating a security tag, printing a receipt, indicating success in a POS system, authorize delivery of an item from a stockroom, unlocking a safe, unlocking a locker, or the like, step 1464. In some embodiments, in peripheral device 1308, a locking mechanism of a turnstile or door is released under direction of reader 1304; user-impeding gates are retracted under direction or reader 1304; a visual display or audio output acknowledging success (e.g. "Valid", "Ok", "Sufficient Funds", a green light, a "ding" sound, or the like) may be output for convenience of the user, human monitors, video recording, or the like. Additionally, reader device 1308 may direct the production of a proof-of payment media by peripheral device 1308. An example of such media is a paper or plastic media with a magnetic storage area, a bar-code (e.g. a visible pattern, QR code, etc.), or the like. Additionally, an acknowledgement 1326 of the approved transaction maybe be sent by reader 1304 to user device 1302, step 1466, for storage thereon.

In various embodiments directed to a service system such as a transit system, upon approval of the token, a user may then board a bus, tram, airplane, or the like; in a service system such a performance or concert, the user may enter the theater, auditorium, sports stadium, or the like; and in an embodiment directed to a good purchase system, the user may then walk out of the store, remove an object from a vending machine, or the like, step 1468.

In some embodiments, it is contemplated that a user interacts a single time with the reader system or the like to receive the goods or services. However, additional embodiments are directed to systems where the user interacts two or more times with a provider system to receive the goods or services. In such cases, the user may check-in to the provider system and later check-out of the provider system in two separate transactions of step 1444. Some examples of this are a subway or train system or toll road where a fare or toll depends upon the distance between the check-in location and the check-out location; a hotel, office or car rental where the rental amount depends upon the rental time; a restaurant, a printer, data service provider or the like where the user checks-in to obtain authorization and the user checks-out after finishing, where the cost depends upon an amount consumed, bandwidth used or pages output, or the like.

In some embodiment, the process described above may generally be used for both the check-in and check-out process. Some differences may include, upon check-in, the security server may receive the authorization from the financial entity in step 1444 to simply indicate that the user has a valid financial account. In additional embodiments, the financial entity may also record the identifier of a first reader device (e.g. associated with the location where the user checks-in) as well as the check-in time. In various embodiments, upon user check-out, the financial entity may record the identifier of a second reader device (e.g. associated with the location where the user checks-out) as well as the check-out time. In real-time or at a later time, based upon the check-in/check-out locations, check-in/check-out times, or the like, the financial entity may determine an amount and then charge the user's account for this amount in step 1444. In other embodiments, upon user check-out, an amount may be determined by the second reader device or the user's smart device. Then, in such embodiments, the financial entity receives the amount from the user's smart device and then processes the transaction for the amount against the user's account.

In some embodiments, a financial server is not used and blockchain principles may be used to record the transactions. In various embodiments, upon registering with security system, financial data need not be provided by the user. Instead, as the provider reader device provides its identifiers to the user's smart device, the user may authorize retrieval of a blockchain key or blockchain address on their smart device. The smart device may then upload the reader identifier, the user's blockchain key or address, the amount of the transaction, and the like to the security server. In response, security server creates a blockchain transaction, and then broadcasts the transaction for validation and entry into a ledger. After broadcasting the transaction, the security server may create and pass the token back to the user's smart device, as discussed above. Similar to the embodiments described above, in cases where there is a check-in/check-out pair of events, the security server may create and upload the blockchain transaction at check-out time.

In still other embodiments, reader 1304 may receive the user's financial information from smart device 1302. In some examples, security server 1306 may provide the encrypted user financial information (e.g. payment account information) back to reader 1304 via smart device 1302. In another embodiment, financial account information need not be stored upon security server, and may be provided from the user's smart device 1302 directly to the reader device 1304. In such examples, the security server 1306 may still authenticate the user and provide a token 1322 back to the user's smart device 1302 for the reader device 1304. In various embodiments, the reader device 1304 may be coupled directly to financial server 1334, and reader device 1304 may directly submit the transaction data 1332 that includes the received user financial account information. In response, financial server 1334 may record the transaction or may debit or charge the user's financial account, and provide a transaction successful message back to reader 1304. Reader device 1304 may then control peripheral device 1308 or direct server 1316 to control peripheral device 1308 upon success. As discussed above, peripheral device 1308 may control a solenoid, lift a gate, open a door, display a success message, play an audio message, or the like. This physical action allows the user to complete the transaction, e.g. board a bus or train, rent a scooter or other vehicle, leave a store, and the like.

Figure 15:
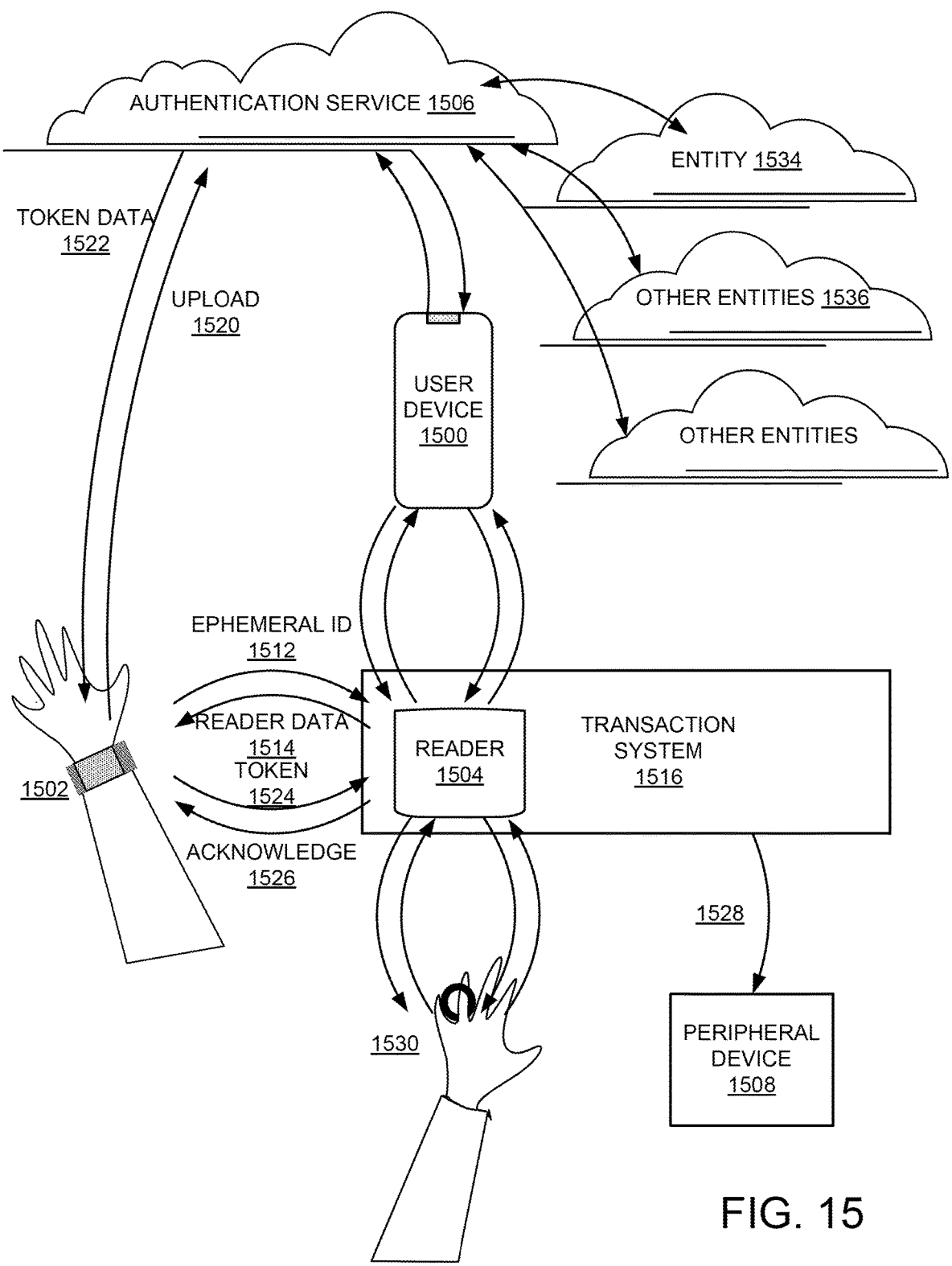
FIG. 15 is a block diagram of a process according to various embodiments of the present invention.

FIG. 15 illustrates a system diagram of additional embodiments of the present invention. In some embodiments, a system includes user devices, such as a first user device 1500, a second user device 1502, a third user device 1530, and the like. In some examples, the user devices may include a smart phone, a smart watch, a smart ring, a smart wearable device (e.g. earbuds, glasses) or the like These user devices are coupled to a reader 1504 (transaction system 1516) via one or more communication channels, such as Bluetooth, BLE, Ultrawide band (UWB), Near field communication (NFC), Zigbee, or the like.

Reader 1504 may be coupled to a transaction system 1516 or be integrated as part of transaction system 1516, e.g. POS system, a kiosk, a terminal, etc. As illustrated, reader 1504 or transaction system 1516 may be coupled to and control a peripheral device 1508. In some examples, peripheral device 1508 may be an electronically controlled device, such as an electronic door or latch, an electronic gate or turnstile, an electronic terminal, a printer, a vehicle, a locker, a computer or the like as described herein. In some embodiments, peripheral device 1508 (e.g. a display, a control panel, a gate) may be integrated into or together transaction system 1516.

In FIG. 15, user devices, such as first user device 1500 and second user device 1502, etc. are coupled to an authentication provider service 1506. These user devices are coupled to authentication provider service 1506 via one or more wide area communication channels, such as WIFI, G4, G5, LTE, Edge, cellular data, Ethernet, mesh network (e.g. utilizing Bluetooth, BLE, Ultrawide band (UWB)), or the like.) In various embodiments, service 1506 may be a cloud-based service implemented in one or more physical or virtual servers. In some implementations, authentication provider service 1506 may provide a software as a service (SaaS).

FIG. 15 also illustrates third-party entities or third-party services, e.g. 1534 and 1536 are coupled to authentication provider service 1506. In various embodiments, services 1534, 1536 and the like may also be a cloud-based services implemented in one or more virtual or physical servers. Services 1534 and 1536 and service 1506, etc. may be coupled via a hard-line computer network, e.g. Ethernet, may be coupled via one or more of the above wide area communications channels, or the like.

Third-party services 1534, 1536, and the like are typically associated with one entity, e.g. a company, an organization, a payment transaction service, or the like. In this example, users associated with first user device 1500 and with second user device 1502 are typically associated with third-party service 1534, e.g. the users of the user devices are employees of a first company (e.g. Google or Apple), the users are members of a first organization (e.g. labor union, AAA), or the like; the user associated with third user device 1530 is associated with another entity 1536, e.g. the user is an employee of a second company, the user subscribes or is a user of a second service (e.g. WeWork), or the like.

In other embodiments, users associated with devices 1500, 1502 and the like may be independent consumers of goods and services and have transactions facilitated by the one entity 1534, e.g. the users have payment accounts with a payment service (e.g. Visa, PayPal) or the like.

FIGS. 16A-F illustrates a block diagram of a process according to various embodiments. In the below discussion, elements illustrated in FIG. 15 are referenced to facilitate explanation of some embodiments.

Figure 16A:
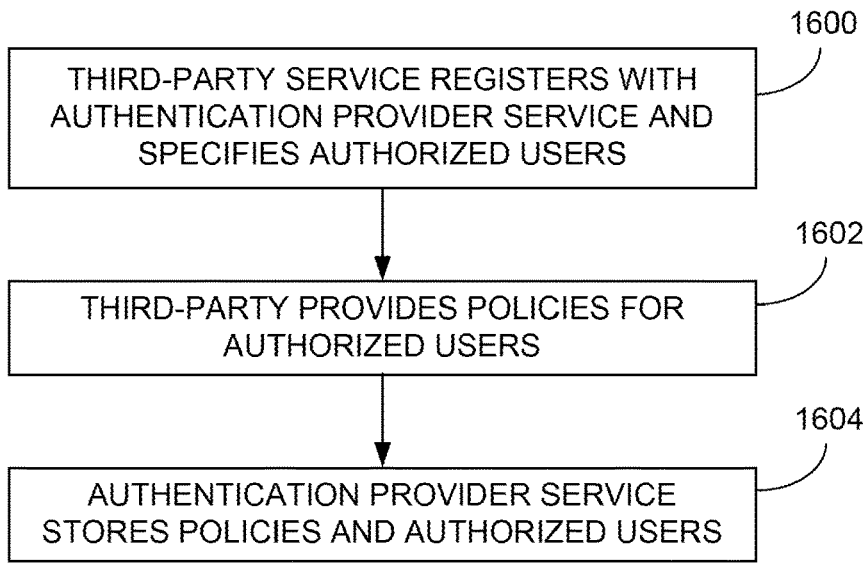
FIGS. 16A-F are flow diagrams of various processes according to some embodiments.

In FIG. 16A, initially, an entity associated with third-party service 1534 registers with authentication provider service 1506. In some cases, by registering, the entity may provide data associated with authorized users, step 1600. Such data may include identification of authorized users (e.g. real or login names, phone numbers, physical or electronic addresses, on-line or social media accounts, etc.), of its employees or contractors, club membership identifications of its members, loyalty card numbers of consumers, and the like. In some embodiments, registering with authentication provider service 1506 may also include providing one or more policies associated with the authorized users, step 1602. As examples, the policies may include an identification of specific good or service providers (e.g. Starbucks, Uber, 24 Hour Fitness, Staples, etc.) that are independent from transaction system 1516, time of day restrictions, transaction quantity or dollar amount restrictions, and the like for the authorized users. In some cases, the policies may detail specific policies for specific users (e.g. parking privileges for disabled users), for specific classes of users (e.g. employees versus contractors), for all users, or the like. In some embodiments, these step may be performed via one or more graphical user interfaces provided on a web interface by authentication service 1506. In other embodiments, a file upload may be used to provide data from entity 1534 to authentication service 1506.

In response to the registration, authorization provider service 1506 may implement or populate one or more data structures that details the authorized users and reflect the appropriate policies for the authorized users, step 1604.

Figure 16B:
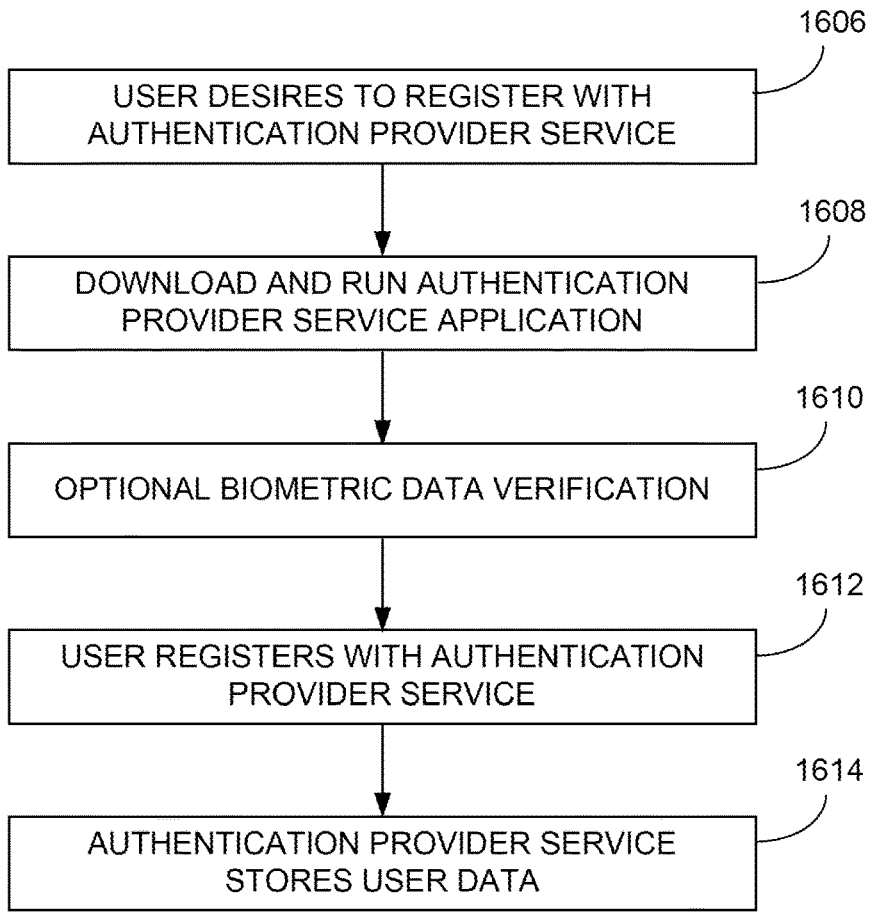

In FIG. 16B, a user of a user device (e.g. 1500, 1502, etc.) desires to register with authentication provider service 1506, step 1606. In some examples, the following steps may be performed at the time of employee on-boarding, user subscribing to a service, and the like. In one embodiment, users may download an application upon their user device from a user device application store (e.g. Apple AppStore, Google Play store, or the like) and install the application on their user device, step 1608. In some embodiments, the authentication application is currently provided by the assignee of the present patent application, Proxy, Inc. other embodiments, the user may download the application via a selection in a App Clip or other just-in-time application provider service. In still other embodiments, the authentication application may be integrated into another third-party application, e.g. a McDonald's App, a Safeway App, an AT&T App, or the like.

In various embodiments, when running the application, the users may first provide biometric data to verify their identity to the users' devices, step 1610. The biometric data may be a fingerprint, voice data, movement data, facial images, heartbeat data, capillary or blood vessel data, or the like. These steps may include verification processes incorporated into the smart device operating system, or the like. Once biometrically verified, then the users may then provide registration data via the application to authorization provider service 1506, step 1612. Some cases may include the users providing identifying data such as their names, employee numbers, membership identifiers, email address, phone numbers, credit card numbers, account numbers or other identifiers. It is contemplated that in some cases one or more of this identifying data will match data at least some of the data provided by one or more third-party services, e.g. service 1534 in step 1600, above.

In response to the registration process, authorization provider service 1506 implements or populates one or more data structures that associates the users' account with the identifying data, step 1614.

In various embodiments, the user registration process may occur prior to the users visiting one or more locations associated with transaction system 1516. For example, the user may register at the time of employment, time of membership, time of issuance of credentials, time of registering on a website, or the like. In other embodiments, the user registration process may occur when the users bring their devices to a location associated with transaction system 1516 (e.g. when visiting a Peets Coffee for the first time). In such embodiments, an identifier associated with transaction system 1516 may be provided to the users in real-time. This identifier may be an electro-magnetic signal (e.g. via NFC, or the like), may be an optical code (e.g. bar code, custom optical code, or the like) that is sensed by the user device, may be provided in an electronic communication (e.g. text message, e-mail message, an Airdrop message, etc.), or the like. In response to the identifier, the user devices may request download and installation of the authentication application in a just-in-time basis.

After the users' registration processes described above, in normal operation, the users' devices enter a mode that scans, in the background, for certain short-range communications signals.

Figure 16C:
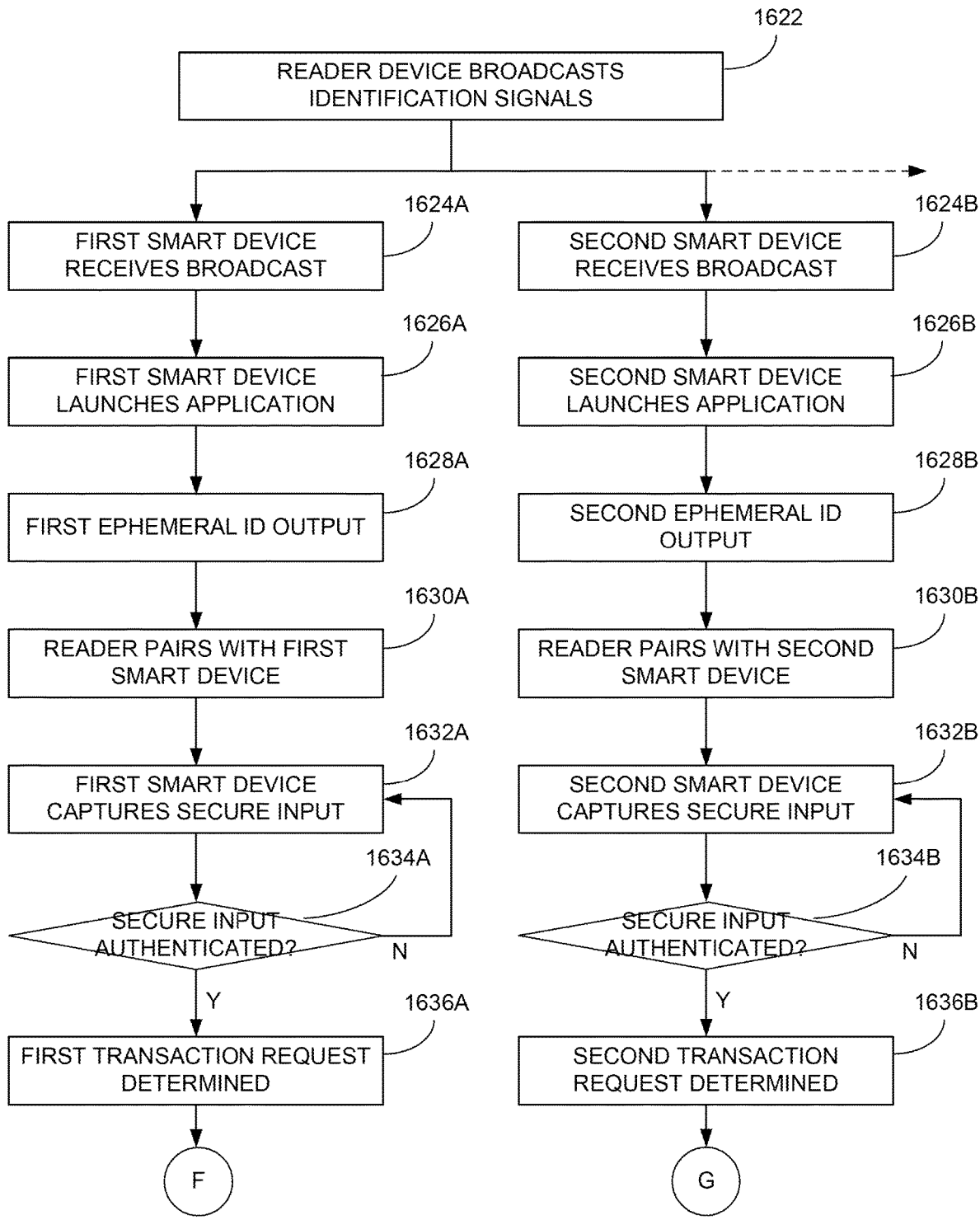
Figure 16D:
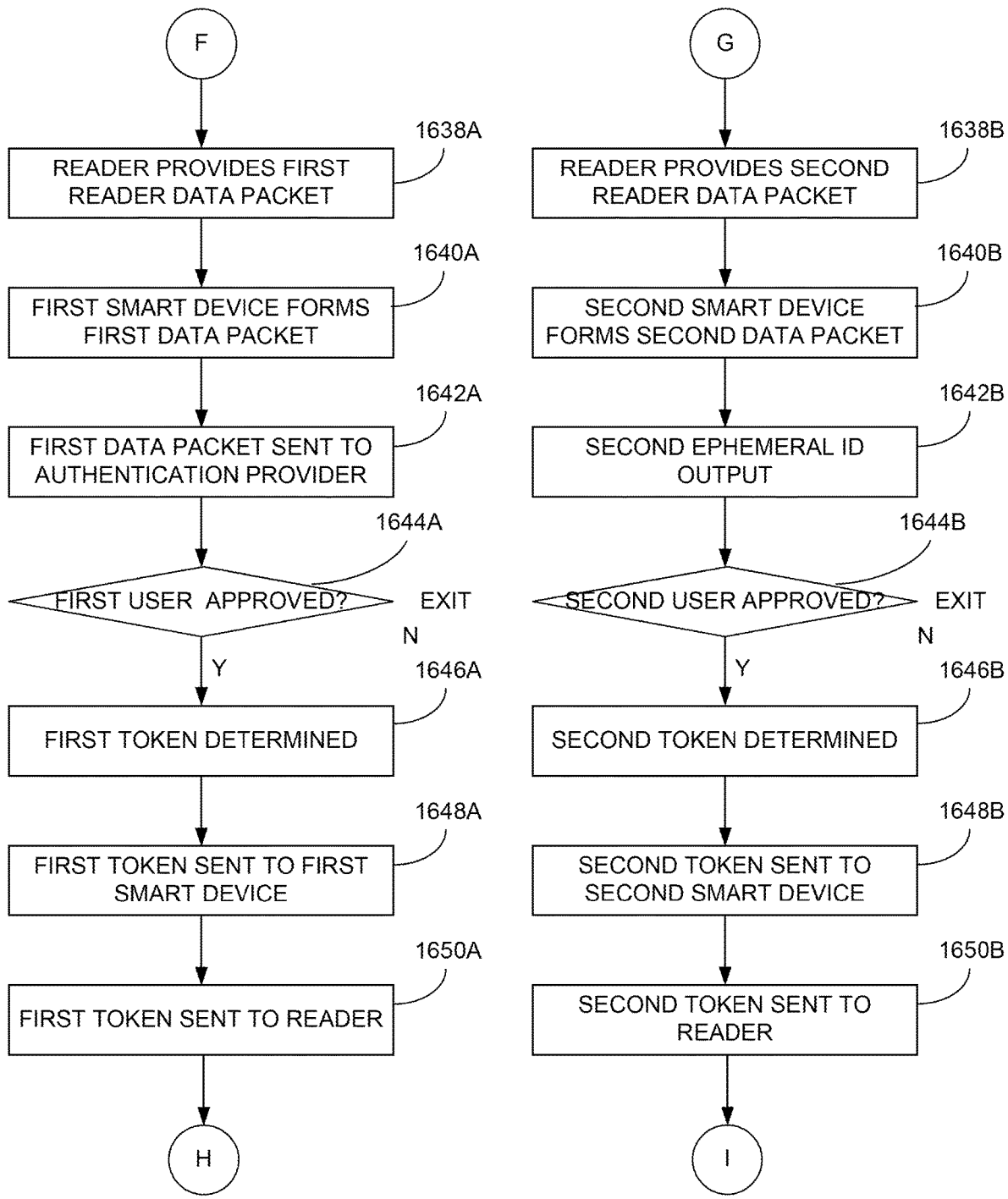
Figure 16E:
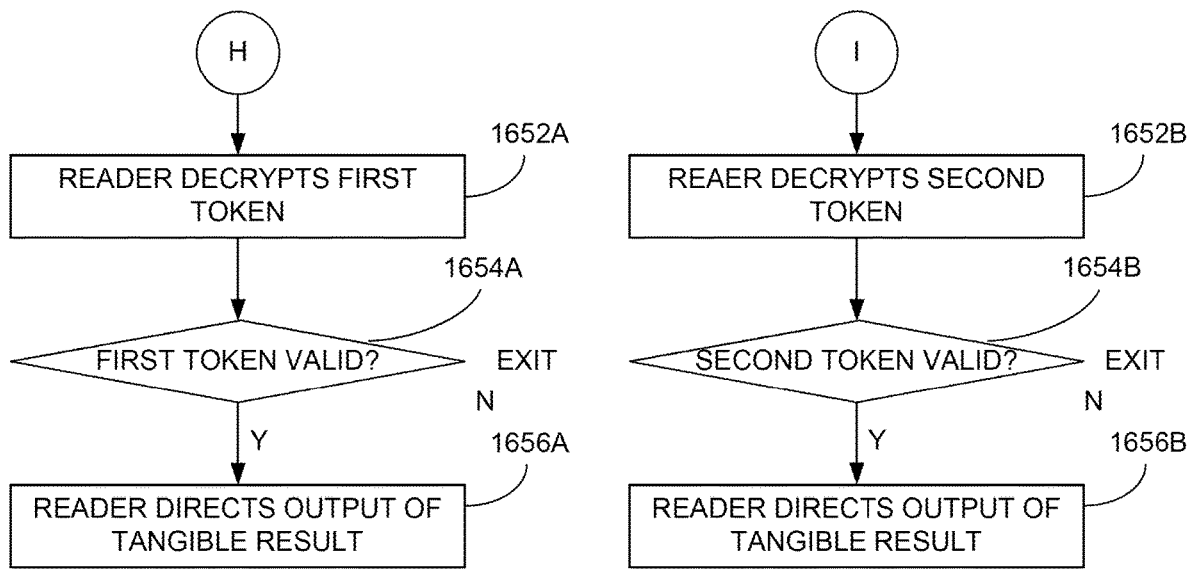

In FIG. 16C, in normal operation, a reader 1504 or transaction system 1516 (e.g. a POS system, an access control system, or the like) outputs reader broadcasting signals, step 1622. Reader 1504 may use a sort-range communications channel, such as Bluetooth, BLE, UWB, Zigbee, or the like.

As illustrated in FIG. 16C, multiple user devices, such as the first user device 1500, second user device 1502, and the like. These devices may interact with reader 1504 at about the same time or at a different time, e.g. minutes later, hours later, a day later, or the like. In the present block diagram two different user devices are illustrated, however it should be understood many more user devices may interact with transaction system 1516. Additionally, these interactions may be in parallel, asynchronously, or serially.

In operation, the first user device 1500 and second user device 1502 scan for short-range communications signals and receive the reader broadcasting signals, steps 1624*a* and 1624*b*. In response, based upon the broadcasting signals, the users' devices may run or launch the application that may have been installed as illustrated in FIG. 16B, on the users' devices, steps 1626a and 1626b. In some cases, if the application is running in the background, it may be brought to the front.

In various embodiments, the users' devices identify themselves to reader 1504 through the output of a first ephemeral identifier (ID) 1512 and a second ephemeral ID, steps 1628a and 1628b. The ephemeral IDs are typically not permanently associated with the user devices and typically cannot be used to identify the user devices. In some embodiments, the ephemeral IDs may utilize or incorporate a MAC addresses of the users' devices and may be randomized.

In some embodiments, when reader 1504 receives ephemeral IDs from user devices, reader 1504 typically pairs with the user devices to enable a more secure communications between reader 1504 and each user device, step 1630a and 1630b. In some examples where BLE is to be used for short-range communications, a Bluetooth pairing process may be performed. In other examples, other types of processes for pairing are contemplated for other short-range communications such as UWB, ZigBee, and the like.

In various embodiments, once the user devices and reader 1504 are paired, the authentication application may require the users of the user devices to authenticate themselves. In some cases, the user devices may capture biometric data of the user, steps 1632a and 1632b, and determine whether the biometric data is validated upon the user devices, steps 1634a and 1634b. As an example of this, the user's device may take a picture of the user's head, and then the user's device may determine whether the picture matches a model of the user's face. Face ID by Apple may be used in some embodiments. As additional examples, the user's device may capture a user's fingerprint and compare it to a model of the user's fingerprint stored in memory of the user's device. In other embodiments, a PIN, password, or two-factor authorization may be also utilized.

In some embodiments, a transaction request for each user's device may then be determined, steps 1636a and 1636b. In some cases, the transaction request may be the same or similar for each user's device, for example a transaction request may be associated with: entry into a fitness facility, exit from a car park, authorization of software services, or the like. In some cases, the transaction request may be unique for each user's device, for example, a transaction request may be associated with: a unique seat number, a specific vehicle usage, data or services customized for each specific user, or the like. In additional cases, the transaction request may be the same for some but not all user devices, for example, a transaction request may include: entry into different stadium sections, an amount for goods or services provided or to be provided to the user, providing different levels of software functionality or performance, an estimated mileage for a ride-service, or the like. As further examples of the above, when a user associated with a first user device orders a coffee and muffin from a coffee store, the transaction request may include: a dollar amount for the transaction, an indication of a drink choice and snack choice, or the like. As another example, when a user enters a shared co-working office space for a meeting, the transaction request may include: a dollar amount for the transaction, an indication of the size of the room desired, an indication of amenities requested for the meeting, and the like.

In some embodiments, transaction system 1516 may be associated with a human staffed check-out register, POS terminal, self-service check-out or check-in kiosk or device, a human staffed check-in desk, and the like. In such embodiments, the transaction request may be initiated by transaction system 1516. As examples, a user of a user device may approach a check-out register and have their desired good or services scanned or entered into transaction system 1516; a user of the user device may approach a shared office-space front desk and an human staff enters the desired office space rental term and desired high-speed internet service into transaction system 1516; a user may approach a self-checkout kiosk or vending machine and scan or enter their desired good or services therein; and the like.

In other embodiments, the transaction request data may be captured or processed by the user device itself. For example, the user may use a website or application for the entity associated with transaction system 1516 (e.g. an application from Apple store, Peets, WeWork, BestBuy, 24 Hour Fitness, etc.) to book or order the goods or services they desire, to see the total cost, to initiate the transaction on their user device (e.g. smartphone, smart watch, etc.), or the like.

In various embodiments, reader 1504 then provides a unique reader data packet e.g. 1514 for each user device, step 1638a and 1638b. In some examples, the unique reader data packet may include some or all of the following data: an identifier associated with reader 1504, an identifier associated with transaction system 1516, an identifier of an entity associated with transaction system 1516 (e.g. a retailer identifier, an organization identifier, a company name), a time stamp or the like. In some examples, reader 1504 may include a time stamp and security key: unique nonce, a random alphanumeric string, a pseudo random word, or the like, within the unique reader data packet for each user device. This time stamp and security key may be maintained in a memory of reader 1504/transaction system 1516 and be associated with the specific ephemeral ID of the associated user device. For example, string 3 and time stamp 1 may be associated with a first ephemeral ID, string 2 and time stamp 3 may be associated with a second ephemeral ID, string 16 and time stamp 10 may be associated with a third ephemeral ID, and the like.

In some embodiments, the unique reader data packet may also include the transaction request data described above in steps 1636a and 1636b if transaction system 1516 captures the transaction request. In various examples, transaction requests for the reader data packets may include monetary amounts, e.g. Dollars, Euros, Yens, etc., quantities, e.g. number of items, e.g. desks, mileage distance allocated, number of service hours, and the like.

The user devices receive the unique reader data packet and combines at least some of the data with additional data, e.g. user identifying data (e.g. from step 1616), ephemeral IDs (e.g. from steps 1628a and 1628b), steps 1640a and 1640b. In various embodiments, this combined data may include the specific transaction requests as part of the unique reader data packet, when captured by transaction system 1516; as part of the additional data, when captured by the user device; or the like. In various embodiments, the combined data packet e.g. 1520 is then transmitted via one or more wide area communications channels, discussed above, to authentication provider service 1506, steps 1642a and 1642b.

In turn, authentication provider service 1506 determines whether the specific user is approved for the specific transaction request, steps 1644a and 1644b, in some embodiments. Authentication provider service 1506 may perform this process by accessing one or more policy tables previously stored to determine if the specific user is authorized for the transaction request. For example, authentication provider server may determine if there is a specific third-party service, e.g. third-party service 1534 associated with the specific user identifying data provided by a user device (e.g. does this person work for a company?, does this person a member of an organization?, etc.); authentication provider service may determine whether the specific user identifying data is authorized to interact with the transaction system associated with the reader identifier or transaction identifier (e.g. is this worker authorized to take a Lyft shared-ride service by the company?, is this subscriber authorized for Wi-Fi service?, and the like); authentication provider service may determine whether the transaction request data is within the authorized limits (e.g. is this transaction for office supplies less than $50?, does a subscriber have 60 minutes of cellular data left?, etc.); and the like. The specific policies for the for specific users, for specific classes of users (e.g. employees versus contractors), for all users, or the like are may be implemented in one or more data structures, as was described above in step 1604.

In additional embodiments, authentication provider service 1506 may also communicate with third party service 1534 to request approvals or additional approvals. As an example, the third party service 1534 may be contacted when a transaction exceeds a particular price limit, when the transaction is of a particular type (e.g. providing of services may be approved by authentication provider service 1506, but providing of hardware resources must be approved by third party service 1534), or the like. In some embodiments, authentication provider service 1506 may contact third party services for every occurrence of a transaction, every hour (or day, etc.) by aggregating transactions, occasionally (every 10 transactions) again aggregating transactions, and the like. Further detail will be provided in conjunction with FIG. 16F, below.

In some embodiments, if authentication provider service 1506 approves the transaction request, authentication provider services 1506 forms tokens specific for each user device, step 1646a and 1646b. In various examples, the tokens may be data packets that are digitally signed with a private key associated with authentication provider service 1506, or the like. In some examples, the data packets may include a number of different data in a payload section. For instance, the data packets may include portions from the specific reader data packet, including time stamps, identifiers of readers, the unique nonce, and the like. Examples of other types of payload data may include a list of additional options available to the user of the specific user devices, such as: upgrades to specific seating groups, vehicle classes, or the like; additional goods or services available for an evening meeting (versus a morning meeting); or the like. The data packets may also specifically include an "approved" message, acknowledgment message, or the like to facilitate the transaction. This message may also include a time stamp, for use of transaction system 1516, to determine if the token is stale, too old, or the like.

In various embodiments, the authentication provider service 1506 returns the formed tokens, e.g. 1522 to each respective user device, steps 1648a and 1648b. Authentication provider service 1506 may use the same wide area network communications mechanism as used above, e.g. WiFi, cellular, or the like to send the token to the user devices, steps 1650a and 1650b. In turn, the specific user device may return the formed tokens, e.g. 1524 to reader 1504 or transaction system 1516. The user devices may use a sort-range communications channel, such as described above, e.g. rf: Bluetooth, BLE, UWB, Zigbee, NFC or the like. In some embodiments, the user devices may display an optical bar code, or the like, that represents the token. That optical bar code may then be captured by an optical scanner coupled to reader 1504 or transaction system 1516.

In alternative embodiments, authentication provider service 1506 may be directly coupled to transaction system 1516, and the tokens or other authorization data may be directly issued to system 1516. In such embodiments, users may be matched-up in transaction system 1516 according to the ephemeral IDs sent by the user devices.

Next, in some embodiments, reader 1504 (or transaction system 1516) decrypts the token, step 1652a and 1652b. In some examples, a public key associated with authentication provider service 1506 is used to process the specific tokens, e.g. 1524 to recover the token payload data. Reader 1504 (or transaction system 1516) may then determine if the token is valid and not stale, steps 1654a and 1654b. As an example, reader 1504 may recover a nonce from the token payload, and compare it to the nonce that was provided in the unique reader data packet for each user device. Additionally, reader 1504 may determine if too much time has elapsed between issuance of the unique reader data packet and presentation of the token, and the like. When the token is not valid or stale, transaction system 1516 may indicate that the transaction request has not been approved. In some embodiments, an acknowledgement signal from authentication provider service 1506 in the token alone may be used to determine that the token is valid, and in other embodiments, this acknowledgement signal may be used in conjunction with the above data (e.g. nonce, time stamp, etc.)

In some embodiments, if the token is valid and not stale, the specific transaction request may be approved, and reader 1504 (or transaction system 1516) may provide a physical output instruction, e.g. 1528 indicating the approval, steps 1656a and 1656b. In some examples, a peripheral device may be coupled to or integrated within transaction system 1516 and be instructed to activate, in response to the approval. In some embodiments, an electromagnetic device may be activated, such as a parking exit gate motor that raises an exit gate, a security door latch that unlocks to allow a user to pass through a gate or turnstile, a servo motor activates that opens a door, and the like. In some embodiments, an electrical device may be activated, such as a specific buttons of an elevator, a computer that allows the user to log in by enabling an input device, a vehicle that allows the user to start and use, and the like. In some embodiments, reader 1504 (or transaction system 1516) may provide physical outputs that enable an attendant or service provider to see if the user is authorized or not. As examples, for an embodiment where transaction system 1516 is a POS terminal or kiosk, a graphical display may provide an "approved" message, a specific color light (e.g. green, yellow or red) may be flashed to indicate status of the transaction request, a specific tone (e.g. beep or buzz) may be audibly output to indicate status of the transaction request, and the like. An acknowledgement, e.g. 1526 may also be provided back to the user devices to confirm the physical action is provided for the application.

Figure 16F:
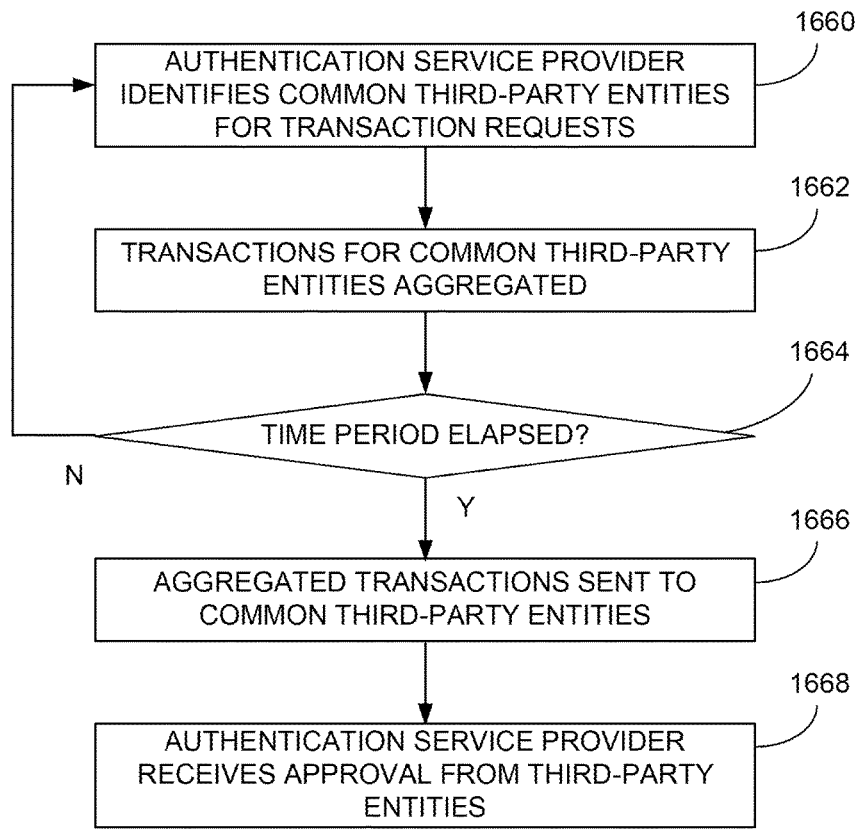

FIG. 16F illustrates a block diagram according to various embodiments of the present invention. More specifically, FIG. 16F illustrates steps that may performed by authentication provider service 1506 after receiving certain transaction requests.

As discussed above, the authentication provider service 1506 may approve transactions requests based upon the policies provided in steps 1644a, 1644b, and the like. In various embodiments, authentication provider service 1506 may determine which transaction requests are associated with the same third-party server (e.g. a specific company (e.g. Netflix, Google, Apple, Proxy, etc.), a specific financial transaction processing company (e.g. Visa, PayPal), or the like, step 1660. Transaction requests associated with a common third-party server or entity may be aggregated, step 1662. This process may be repeated for a particular amount of time (e.g. every hour, every day, or the like), for a particular number of transactions (e.g. 10, 20, 100 transactions, or the like) step 1664, for a particular amount of transactions (e.g. when the aggregate transactions exceed a particular amount (e.g. $1000 of charges, 1000 miles used, 500 megabytes of cellular data used, etc.), and the like. Examples of such situations include when third party servers desire to monitor or control the goods or services authorized by authentication provider service 1506, but receiving reports for each transaction would be highly burdensome to the third party service. Accordingly, embodiments greatly reduce the network traffic resource burden and network traffic hardware required, and also reduce the processing burden and processing resources required.

In various embodiments, after the predetermined period of time (or the like), authentication provider service 1506 sends the aggregated transactions to the third-party service, e.g. 1534, step 1666. This process may be performed using wide area network communications methods, such as Ethernet, Wi-Fi, or the like. In response to the aggregated transaction, the third-party service may approve the transactions in the aggregate for authentication provider service 1506. Additionally, the third-party service may record the multiple transaction requests along with the associated identifiers (e.g. phone number, email address) of the users making the requests, and the like. As examples of these aggregated transactions, a company associated with service 1534 may receive notice that 10 employees have used a 24 Hour Fitness gym on that day; a social club associated with another service may receive notice that 105 members have spent a total of $600 at Starbucks cafes over a weekend; and the like. As additional examples, a financial transaction provider (e.g. Visa, Mastercard) may receive a single transaction request for $800 from authentication provider service 1506, that authentication provider service 1506 has approved and aggregated from 38 separate user/customer transactions at a goods or service provider for a day.

The aggregation process greatly benefits authentication provider service 1506 and the third-party servers by reducing the number of transactions passed there between. This reduction is especially advantageous when scaling up embodiments of the present invention to hundreds, thousands, if not more transactions per hour, or the like. In cases where authorization is typically desired for each transaction, e.g. for credit-card processing, authentication provider service 1506 may aggregate transactions from multiple customers and periodically submit a single transaction to a credit-card processing server. For example, instead of authentication provider service 1506 providing 160 credit-card transactions for approval from a credit-card processing server, service 1506 may aggregate the 160 transaction requests and submit a single transaction to the credit-card processing server. In such cases, the risk of loss due to fraud between submissions may sometimes be borne by authentication provider service 1506. By greatly reducing the number of transaction communications, authentication provider service 1506 can be more efficient and can support a greater number of transactions with existing hardware resources. As mentioned above, this increased efficiency in operation of existing hardware is especially valuable when the number of transaction service requests greatly increases or scales up, e.g. exponentially.

In various embodiments, authentication provider service 1506 may receive a response from third-party service 1534, step 1668. In response, authentication provider service 1506 may apportion the aggregated transaction request (e.g. approval for $500 credit charge) to the original transaction requests (e.g. 10 customers each charging $50).

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

Further embodiments can be envisioned to one of ordinary skill in the art after reading this disclosure. For example, in some embodiments, a smart device may be a ring, a smart watch, a fitness tracker, smart glasses, smart earbuds or earphones, a patch worn on the skin, smart phone and the like. Additionally, the reader interacting with the smart device may be a smart tablet, a smart phone, a computer, a control access system, POS system and the like. Further, the cloud-based authentication service may provide service for one organization or multiple organizations and may be implemented as virtual machines, and the like. In light of the current patent disclosure, one of ordinary skill in the art will recognize other criteria that can be incorporated into alternative embodiments of the present invention.

Additional embodiments can be envisioned to one of ordinary skill in the art after reading this disclosure. For example, in some embodiments, health-based issues may be incorporated into policies that are stored in authentication provider service 1506. For example, if a user has tested positive for a communicable disease as of a particular date, the policies may include a quarantine period after the positive test date. In operation, although the user may fulfill all of the above policies, but tries to conduct the transaction request while still within the quarantine period, the transaction request may be denied. In such cases a token may still be generated by authentication provider service 1506, but indicating that the transaction request is denied. When processed by reader 1504, the token may be validated, but the peripheral device will not be activated. For example, a security door will not unlock, the user may not log into a computer, the user may be denied entry into a location (e.g. a third-party health club, a third-party shared office space, a ride sharing service), the user will not be able to rent a vehicle, or the like. In some cases, the user may be notified by output (e.g. a message) from peripheral device 1508 and/or the user's device (e.g. 1502).

In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A method for a system comprising:

broadcasting with a first short-range transceiver of a first reader system associated with a first provider, a first identifier to plurality of smart devices, including a first smart device;

receiving with the first short-range transceiver of the first reader system, a first ephemeral ID from the first smart device, wherein the first ephemeral ID is not permanently associated with a first user of the first smart device;

providing with the first short-range transceiver of the first reader system, first transaction data comprising a first reader identifier associated with the first reader system, a first unique data packet, and a first indicator associated with a first transaction, to the first smart device;

receiving in an authentication provider service a first identifier associated with the first smart device and the first transaction data from the first smart device;

determining in the authentication provider service whether the first user of the first smart device is authorized for the first transaction in response to the first identifier, the first reader identifier, the first indicator, and a first set of policies specified by a third-party entity, wherein the third-party entity is independent of the first provider, and wherein the third-party entity is associated with the first user;

determining in the authentication provider service a first token in response to the first unique data packet, and in response to the first user of the first smart device being determined to be authorized for the first transaction;

receiving with the first short-range transceiver of the first reader system, the first token from the first smart device;

determining in a first processor of the first reader system whether the first token is valid, in response to the first token;

directing with the first processor of the first reader system, a first peripheral device coupled to the first reader system to perform a first physical action in response to the first token being determined to be valid;

broadcasting with a second short-range transceiver of a second reader system associated with a second provider, a first identifier to plurality of smart devices, including the first smart device, wherein the second provider is independent of the first provider;

receiving with the second short-range transceiver of the second reader system, a second ephemeral ID from the first smart device, wherein the second ephemeral ID is not permanently associated with the first user of the first smart device;

providing with the second short-range transceiver of the second reader system, second transaction data comprising a second reader identifier associated with the second reader system, a second unique data packet, and a second indicator associated with a second transaction, to the first smart device;

receiving in the authentication provider service the first identifier associated with the first smart device and the second transaction data from the first smart device;

determining in the authentication provider service whether the first user of the first smart device is authorized for the second transaction in response to the first identifier, the second reader identifier, the second indicator, and the first set of policies specified by the third-party entity, wherein the third-party entity is independent of the second provider;

determining in the authentication provider service a second token in response to the second unique data packet, and in response to the first user of the first smart device being determined to be authorized for the second transaction;

receiving with the second short-range transceiver of the second reader system, the second token from the first smart device;

determining in a second processor of the second reader system whether the second token is valid, in response to the second token; and directing with the second processor of the second reader system, a second peripheral device coupled to the second reader system to perform a second physical action in response to the second token being determined to be valid.

2. The method of claim 1 wherein the first physical action is selected from a group consisting of: activating a servo motor, opening a gate, enabling a door handle, unlatching a door latch, deactivating an electromagnet, and opening a door.

3. The method of claim 1 wherein the first physical action is selected from a group consisting of: enabling user selections on a user input device, logging into a computing system, enabling access to software services, and enabling a vehicle to be used.

4. The method of claim 1 wherein the first physical action is selected from a group consisting of: displaying a particular message on a display, playing a particular audio output, activating a status light, printing a receipt, and priming a claim check.

5. The method of claim 1 wherein the first indicator is selected from a group consisting of: a dollar amount, a quantity of goods, a time duration, a distance, a number of rooms, a number of desks, a number of admissions.

6. The method of claim 1 wherein the first transaction is associated with a service transaction selected from a group consisting of: providing a service, providing entry to a location, providing entry to a vehicle, providing access to computing hardware, providing access to computing software services.

7. The method of claim 1 wherein the first user remains anonymous with regards to the first reader system.

8. The method of claim 1 wherein the determining in the authentication provider service whether the first user of the first smart device is authorized for the first transaction comprises:

determining in the authentication provider service the third-party entity in response to the first identifier;

determining in the authentication provider service the first set of policies specified by the third-party entity.

9. The method of claim 1 further comprising:

receiving in a processor of the first smart device, the first identifier from the first reader system;

initiating with the processor, execution of an application associated with the authentication provider service, in response to the first identifier; and outputting under direction of the processor, the first ephemeral ID in response to the first identifier.

10. The method of claim 1 wherein the method further comprises:

determining in the authentication provider service whether the first user of the first smart device is disqualified for the second transaction in response to a health indicator flag associated with the first user;

wherein determining in the authentication provider service the second token comprises determining in the authentication provider service the second token in response to the second unique data packet, in response to the first user of the first smart device being determined to be authorized for the second transaction, and in response to the first user not being disqualified for the second transaction; and inhibiting with the second processor of the second reader system, the second peripheral device coupled to the second reader system from performing the second physical action in response to absence of the second token.

11. A transaction system comprising:

a first reader system coupled to a first peripheral device, wherein the first reader system is associated with a first provider, comprising:

a first short-range transceiver configured to output a first identifier to plurality of smart devices, including a first smart device, configured to receive a first ephemeral ID from the first smart device, wherein the first ephemeral ID is not permanently associated with a first user of the first smart device, configured to provide first transaction data comprising a first reader identifier associated with the first reader system, a first unique data packet, and a first indicator associated with a first transaction, to the first smart device, and configured to receive a first token from the first smart device; and a first processor configured to determine whether the first token is valid, and configured to direct the first peripheral device to perform a first physical action in response the first token being determined to be valid;

a second reader system coupled to a second peripheral device, wherein the second reader system is associated with a second provider, and wherein the first reader system is not associated with the second reader system, comprising:

a second short-range transceiver configured to output a second identifier to plurality of smart devices, including the first smart device, configured to receive a second ephemeral ID from the first smart device, wherein the second ephemeral ID is not permanently associated with the first user of the first smart device, configured to provide second transaction data comprising a second reader identifier associated with the first reader system, a second unique data packet, and a second indicator associated with a second transaction, to the first smart device, and configured to receive a second token from the second smart device; and a second processor configured to determine whether the second token is valid, and configured to direct the second peripheral device to perform a second physical action in response the second token being determined to be valid; and an authentication provider service configured to receive a first identifier associated with the first smart device and the first transaction data from the first smart device, configured to determine whether the first user of the first smart device is authorized for the first transaction in response to the first identifier, the first reader identifier, the first indicator, and a first set of policies specified by a third-party entity, wherein the third-party entity is independent of the first provider, and wherein the third-party entity is associated with the first user, configured to determine a first token in response to the first unique data packet, and in response to the first user of the first smart device being determined to be authorized for the first transaction, configured to receive a second identifier associated with the first smart device and the second transaction data from the first smart device, configured to determine whether the first user of the first smart device is authorized for the second transaction in response to the first identifier, the second reader identifier, the second indicator, and the first set of policies specified by the third-party entity, wherein the third-party entity is independent of the first provider, configured to determine a second token in response to the second unique data packet, and in response to the first user of the first smart device being determined to be authorized for the second transaction.

12. The transaction system of claim 11 wherein the first peripheral device is selected from a group consisting of: a servo motor, an electronically controllable access gate, an electronically controllable door handle, an electronically controllable door latch, an electromagnet, and an electronically controllable vehicle door.

13. The transaction system of claim 11 wherein the first peripheral device is selected from a group consisting of: an electronically controllable user input device, a computing system with an electronically controllable hardware access, a computing system with an electronically controllable software access, and a vehicle with an electronically controllable activation access.

14. The transaction system of claim 11 wherein the first peripheral device is selected from a group consisting of: a display configured to display status messages, a speaker configured to output audio signals, a status light, a printer configured to print a receipt or claim check.

15. The transaction system of claim 11 wherein the first indicator is selected from a group consisting of: a dollar amount, a quantity of goods, a time duration, a distance, a number of rooms, a number of desks, a number of admissions.

16. The transaction system of claim 11 wherein the first transaction is associated with a service transaction selected from a group consisting of: providing a service, providing entry to a location, providing entry to a vehicle, providing access to computing hardware, providing access to computing software services.

17. The transaction system of claim 11 wherein the first user remains anonymous with regards to the first reader system and the second reader system.

18. The transaction system of claim 11 wherein the authentication provider service is configured to determine the third-party entity in response to the first identifier; and wherein the authentication provider service is configured to determine the first set of policies specified by the third-party entity, in response to the third-party entity being determined.

19. The transaction system of claim 11 further comprising the first smart device comprising:

a third short-range transceiver is configured to receive the first identifier from the first reader system, and configured to output the first ephemeral ID in response to the first identifier; and a third processor coupled to the transceiver, wherein the third processor is configured to initiate execution of an application associated with the authentication provider service, in response to the first identifier.

20. The transaction system of claim 11 wherein the first short-range transceiver is selected from a group consisting of: Bluetooth, Bluetooth Low Energy (BLE), NFC, ZigBee, Ultrawide Band (UWB), and radio frequency (rf).

* * * * *